Dec. 17, 1957  J. B. ARMITAGE ET AL  2,816,487
MILLING MACHINE
Filed Sept. 16, 1948   12 Sheets-Sheet 1

INVENTORS
Joseph B. Armitage,
Harold L. Heywood,
BY John L. Martin.
W. D. O'Connor
Attorney Dec. 17, 1957   J. B. ARMITAGE ET AL   2,816,487
MILLING MACHINE Filed Sept. 16, 1948   12 Sheets-Sheet 2

INVENTORS.
Joseph B. Armitage,
Harold L. Heywood,
BY John L. Martin.

W. D. O'Connor
Attorney

Dec. 17, 1957    J. B. ARMITAGE ET AL    2,816,487
MILLING MACHINE
Filed Sept. 16, 1948      12 Sheets-Sheet 3
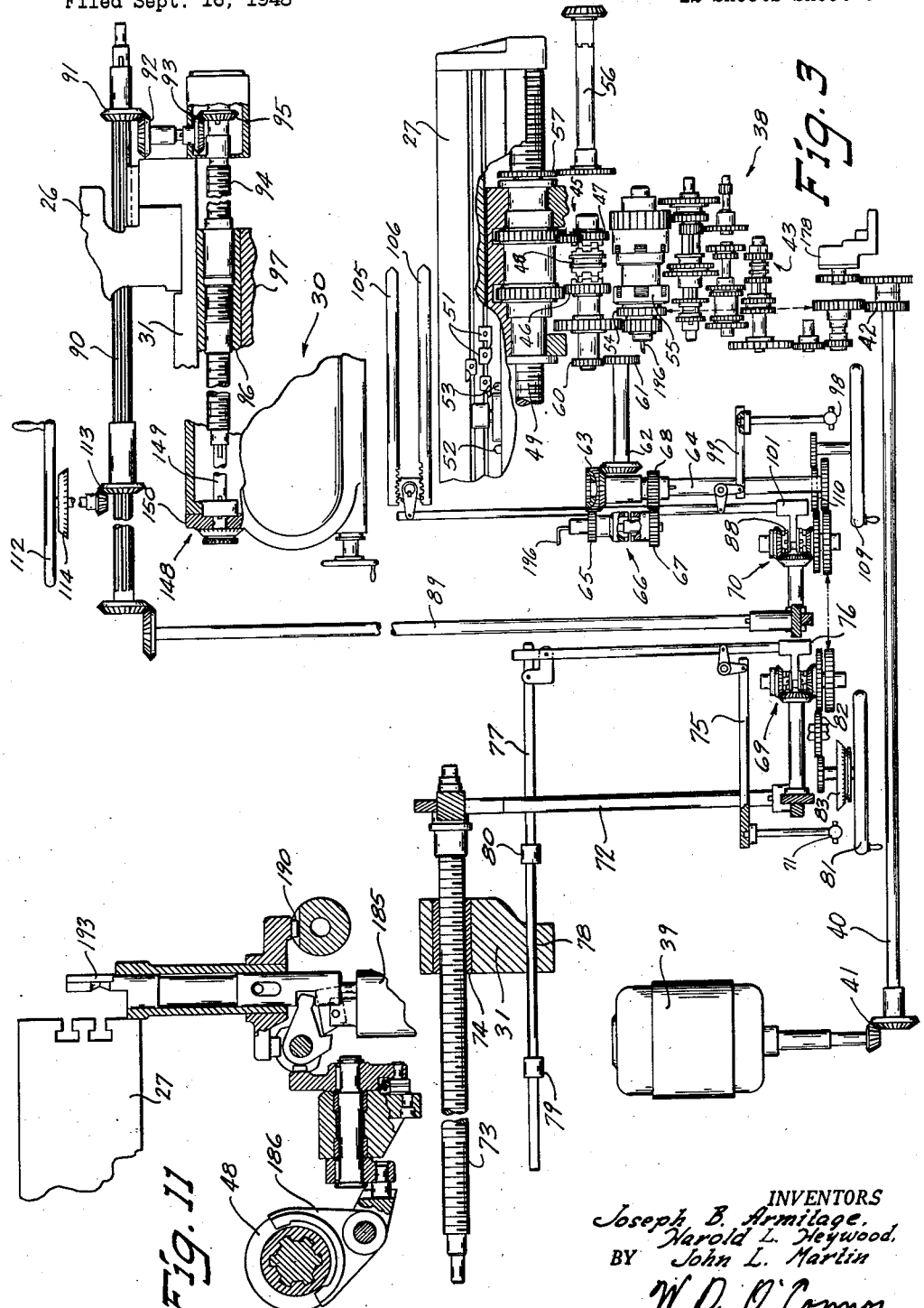
INVENTORS
Joseph B. Armitage,
Harold L. Heywood,
BY   John L. Martin
W. D. O'Connor
Attorney

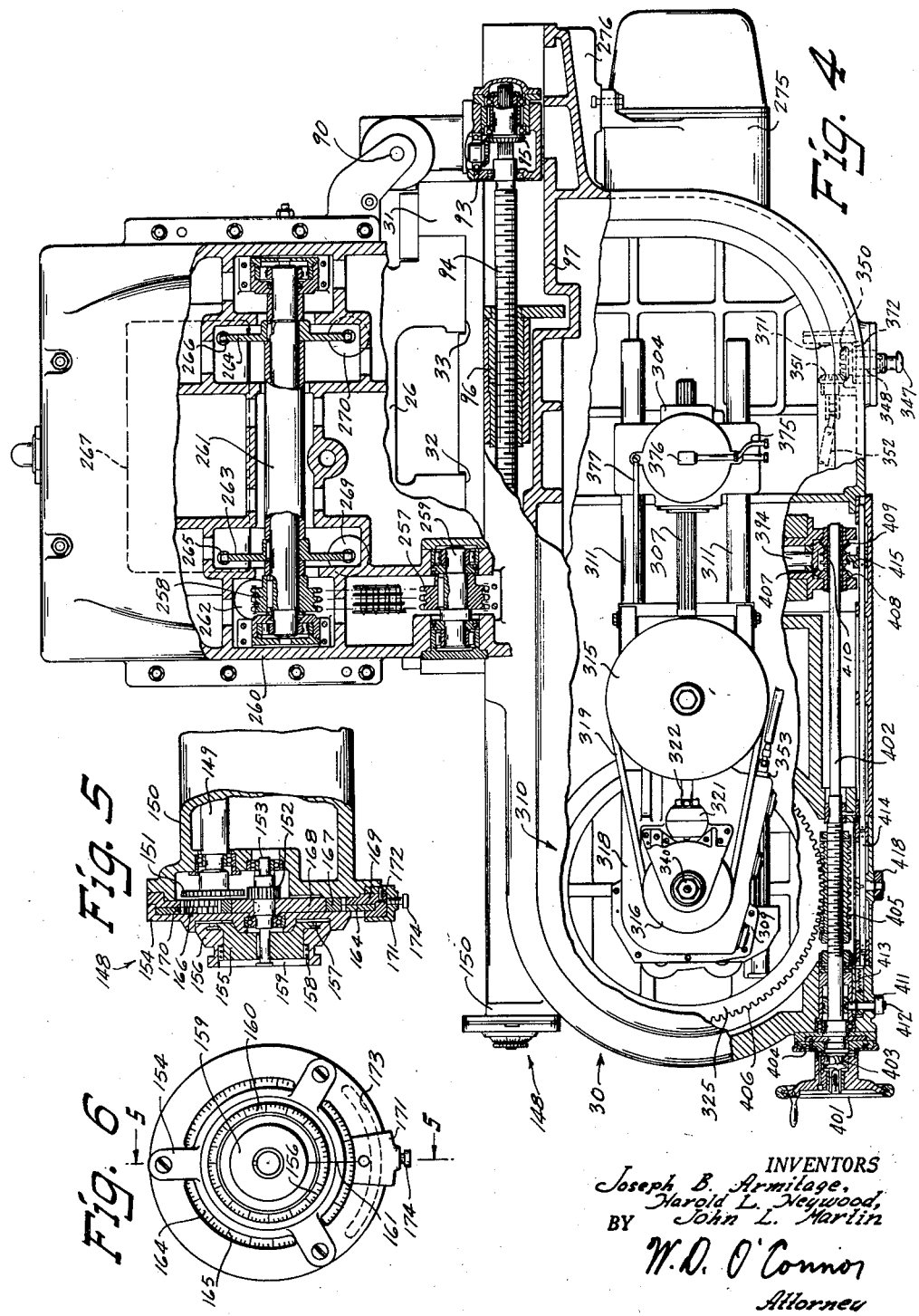

Dec. 17, 1957   J. B. ARMITAGE ET AL   2,816,487
MILLING MACHINE
Filed Sept. 16, 1948   12 Sheets-Sheet 5
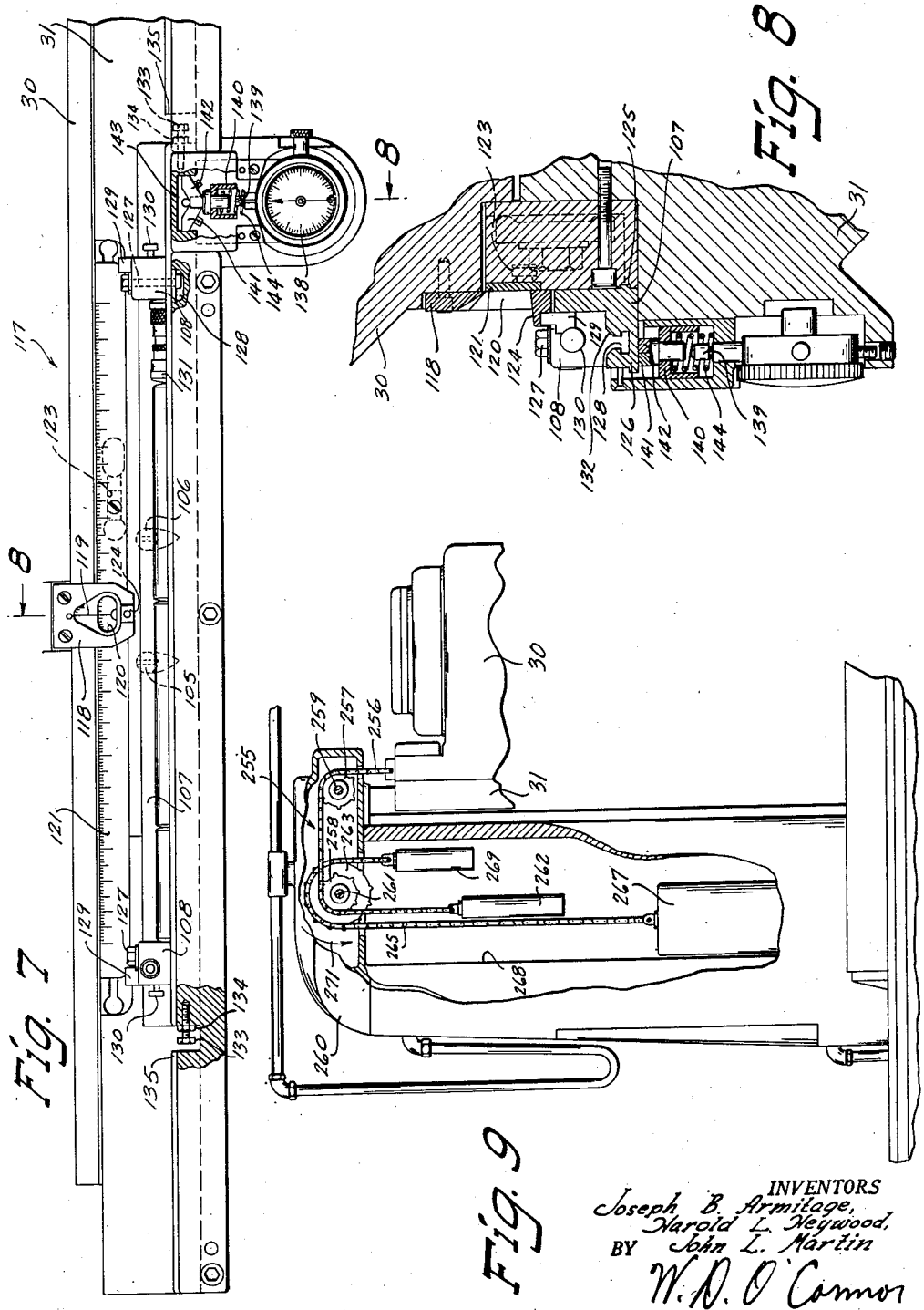
INVENTORS
Joseph B. Armitage,
Harold L. Heywood,
BY John L. Martin
W. D. O'Connor
Attorney

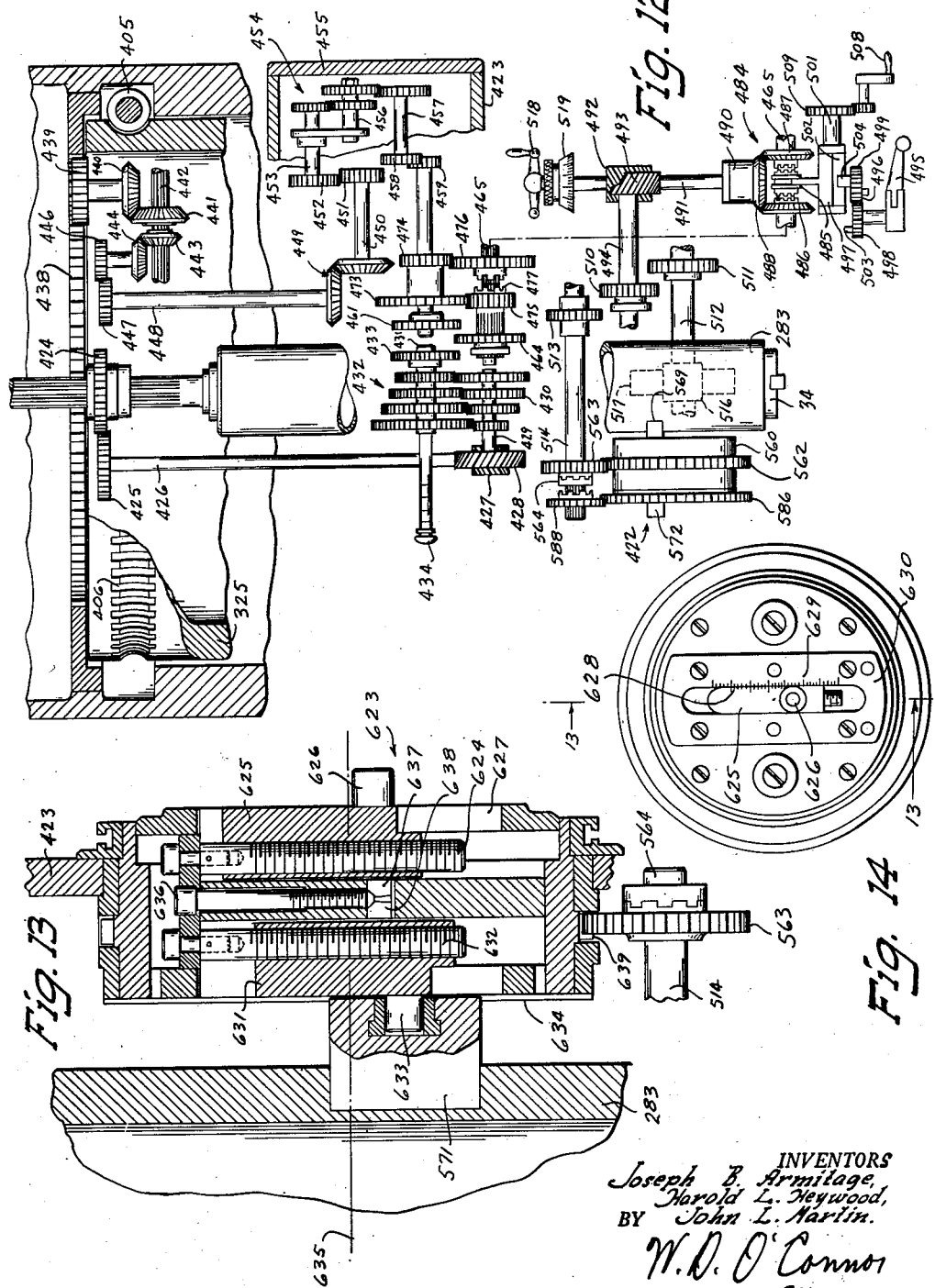

Dec. 17, 1957  J. B. ARMITAGE ET AL  2,816,487
MILLING MACHINE
Filed Sept. 16, 1948  12 Sheets-Sheet 8

INVENTORS
Joseph B. Armitage,
Harold L. Heywood,
BY John L. Martin.
W. D. O'Connor
Attorney Dec. 17, 1957  J. B. ARMITAGE ET AL  2,816,487
MILLING MACHINE
Filed Sept. 16, 1948  12 Sheets-Sheet 10
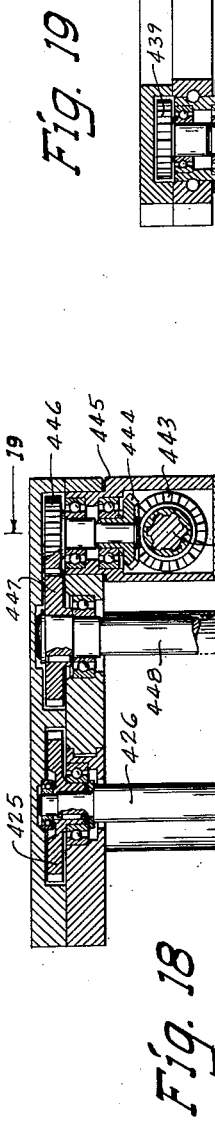
INVENTORS
Joseph B. Armitage,
Harold L. Heywood,
BY John L. Martin.
W. D. O'Connor
Attorney

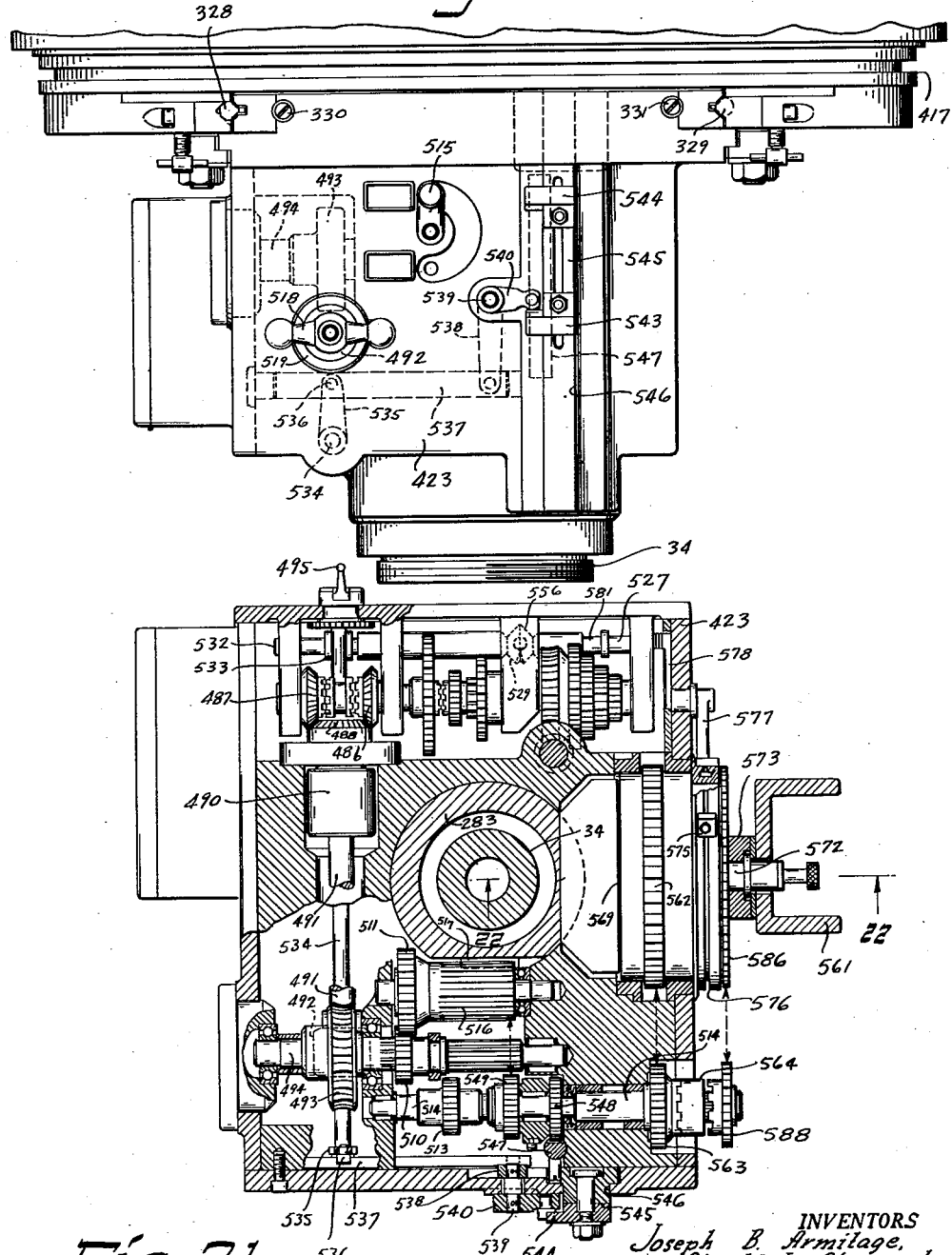

Dec. 17, 1957   J. B. ARMITAGE ET AL   2,816,487
MILLING MACHINE
Filed Sept. 16, 1948   12 Sheets-Sheet 12
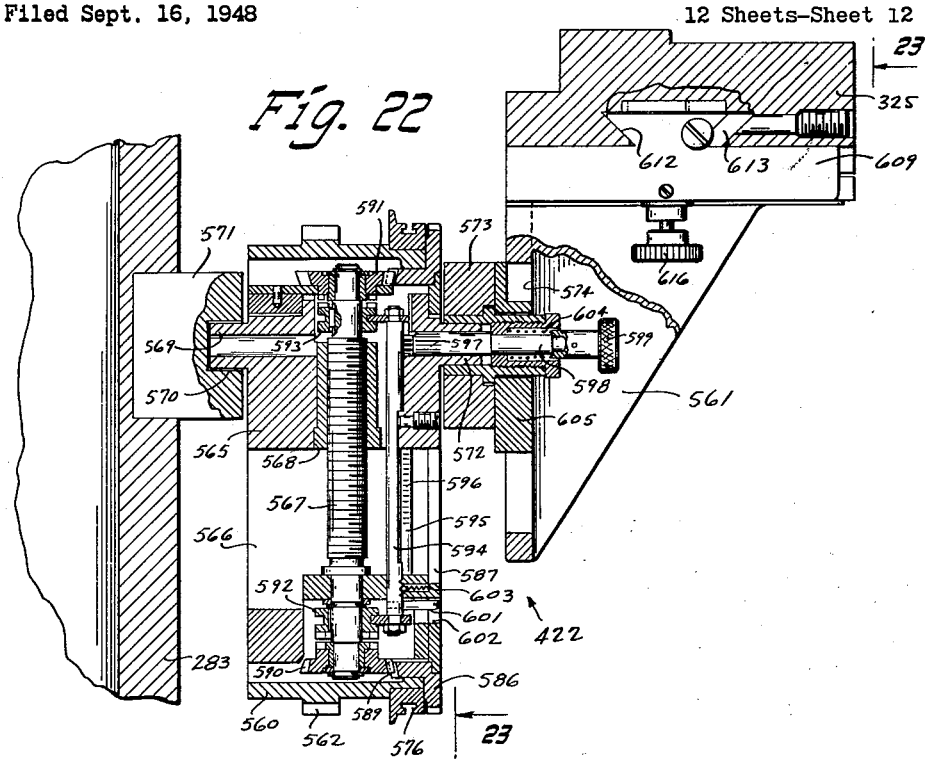
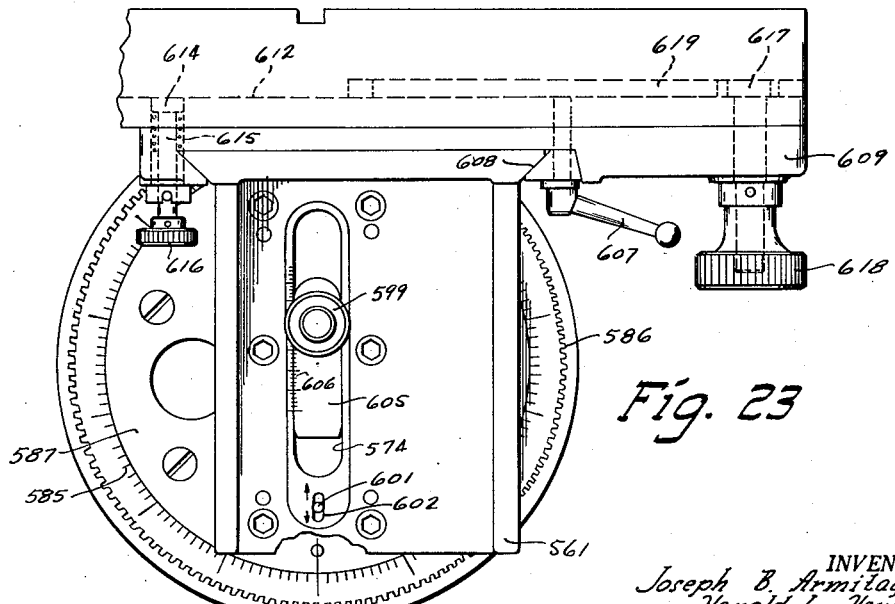
INVENTORS
Joseph B. Armitage,
Harold L. Heywood,
BY  John L. Martin
W. D. O'Connor
Attorney United States Patent Office 2,816,487
Patented Dec. 17, 1957

2,816,487

MILLING MACHINE

Joseph B. Armitage, Wauwatosa, and Harold L. Heywood and John L. Martin, West Allis, Wis., assignors to Kearney & Trecker Corporation, West Allis, Wis., a corporation of Wisconsin Application September 16, 1948, Serial No. 49,516

23 Claims. (Cl. 90—15)

This invention relates generally to improvements in machine tools and more particularly to an improved bed type milling machine especially adapted to perform intricate machining operations on workpieces such as dies, patterns, and the like.

A general object of the invention is to provide an improved milling machine of the bed type especially adapted to perform intricate milling operations on work-pieces through the use of an improved bodily movable tool spindle.

Another object of the invention is to provide a milling machine of the bed type with a selectively operable rotary tool-retaining spindle head mechanism.

Another object of the invention is to provide an improved milling machine adapted to effect angular, circular or arcuate machining operations upon a workpiece by means of a selectively and precisely operable rotary tool retaining spindle head.

Another object of the invention is to provide a rotary head milling machine presenting an improved power driven work supporting table and an improved rotary tool retaining spindle head assembly.

Another object is to provide a machine tool having an improved power transmission mechanism for selectively driving the movable elements thereof.

Another object of the invention is to provide a rotary head type machine tool having an improved rotary head drive mechanism therein for selectively rotating a bodily movable tool retaining spindle.

Still another object of the invention is to provide a rotary head milling machine having a dial mechanism mounted in the stationary head casing and operative to shift gears in the rotary head.

Still another object is to provide an improved power transmitting mechanism for rotating a tool spindle while it is subjected to gyratory movement in a plurality of planes.

Another object of the invention is to provide power drive mechanism in a gyratory type machine tool head which is adapted to effect coordinated cross-feeding movement and axial movement of a tool retaining spindle.

Another object is to provide an improved rotary head milling machine especially adapted to perform intricate cherrying operations and the like on a workpiece.

Still another object of the invention is to provide an improved rotary tool retaining head on a milling machine with a single motor driven transmission means selectively operable to drive the tool spindle and to effect rotation of the tool head.

Another object of the invention is to provide a dual transmission mechanism which is power driven and which includes a reverser control means whereby the direction of rotation of either of the driven elements may be selectively reversed without changing the direction of rotation of the other element.

Still another object is to provide an improved motor mounting means including an eccentric plate adapted to adjust the motor shaft for alignment with a driven member.

Still another object of the invention is to provide an improved power driven dial mechanism which serves to provide a direct reading in inches and thousandths.

Another object of the invention is to provide a tool carrying headstock with improved counterbalancing means to selectively retain the headstock in position on the machine upright.

Another object of the invention is to provide a cherrying means for a rotary head machine tool in which the cherrying drum may be predeterminately adjusted to precisely control and coordinate the axial movement of the quill and the transverse movement of the cross slide.

Another object is to provide a cherrying device for a machine tool whereby it is possible to effect a coordinated movement of a tool retaining spindle in two transverse planes.

Still another object is to provide a rotary head machine tool with a cherrying device and with variable speed transmission means to drive the cherrying device at a predetermined feed rate in relation to the feed rate of the rotary head.

Another object of the invention is to provide a cherrying means for a machine tool and automatic control means to precisely control the operation of the cherrying means.

Another object is to provide a power driven cherrying means for a machine tool and control means operative to control the operation of said power means in a predetermined manner.

Another object of the invention is to provide a rotary head milling machine with a power means to drive the tool spindle and a second power means to effect a feed movement of the tool spindle in one or more of three transverse planes.

Another object of the invention is to provide an improved cherrying means for effectively machining intricate spherical and conical configurations or any desired segments thereof.

Another object of the invention is to provide an improved rotary head milling machine having transmissions to drive the spindle and to effect movement of the spindle in several transverse planes together with electric control means to disconnect the power source from driving the transmissions when changes in the sped and feed settings of the transmissions are effected.

Another object is to provide a hydraulic control system for a machine tool having an improved power driven headstock slidably mounted thereon, the arrangement being such that the head stock may be selectively clamped in position with the power driving elements for moving the headstock being rendered inoperable while it is clamped in position.

Still another object is to provide a machine tool having a plurality of movable elements selectively positionable and hydraulic clamping means to clamp the elements in any position without distorting the alignment thereof.

Another object of the invention is to provide a plurality of clamping mechanisms operative to clamp a movable machine tool element, and interlocking control means manually operable to simultaneously effect operation of each of said clamping means.

According to this invention, an improved bed type milling machine having a base, a work supporting table and an upright attached to the base is provided with an improved rotary head, tool-retaining spindle mechanism operatively mounted on the upright. The machine is particularly adapted to perform intricate machining operations on dies, or the like, which are mounted on the work supporting table. The table and rotary head carried on the upright may be relatively positioned to enable tools mounted in the spindle to perform high precision machining operations on the workpiece including angular, circular or arcuate operations in accurately established relationship. The tool supporting spindle is preferably disposed vertically in the rotary head and is power driven at any one of a plurality of speed rates by means of a fixed-step transmission and motor. The spindle is journalled in a rotatably mounted head and is arranged for radial adjustment therein in order to provide selective positioning thereof for effecting arcuate movements of the spindle along paths of different radii. The same motor which drives the tool retaining spindle is utilized to effect rotation of the head by means of a feed transmission interconnected with the spindle transmission. A reverser mechanism is adapted to permit a reversal in the direction of rotation of either of the driven members without changing the direction of rotation of the other member. An improved range change control mechanism for the spindle transmission is provided wherein a rotatable cam dial control mechanism is mounted in the stationary head casing and connected with the shifter forks in the rotary head to effect selective positioning of the range change gearing in the transmission. Electrical control means automatically operative when range change and spindle speed shifting is effected, serves to disconnect the drive motor and to provide inching in order to facilitate gear shifting in the transmission. A pressure lubricating system is provided to supply all of the movable parts in the rotary head with an adequate supply of oil, regardless of the relative position of the parts in the head casing. A power driven cherrying device is also disposed within the rotary head to coordinate the axial feeding movement of the spindle with the transverse movement thereof whereby intricate cherrying operations can be performed on the workpiece.

The rotary head assembly is mounted on an improved cross-feed slide carried on a saddle slidably mounted for vertical movement on the machine tool upright. The saddle is supported on the upright by an improved system of counterweights which afford a two to one mechanical advantage and thus relieve the power drive from the excessive weight of the head. A single feed motor mounted on the rear of the upright member is connected to afford a power drive for moving the saddle member vertically on the upright and for moving the rotary head assembly horizontally on the saddle. The motor is connected to a feed transmission which in turn is connected to a manually or automatically operable power distribution mechanism. This mechanism, in turn, is connected to the cross-feed and elevating drive mechanism operably engaging with the saddle and rotary head casing. The power drive mechanism is also connected to drive the table screw and effect movement of the work retaining table. Thus, the table and the tool retaining saddle and rotary head assemblies may be power driven in either direction at a selected feed rate or at rapid traverse rate. Control mechanism is provided to enable the operator to control the operation of either of the three machine elements from the front or the side of the machine with equal facility and ease. Each of the three elements is provided with a plurality of hydraulically actuated clamping devices which are selectively operative to rigidly clamp the elements in any desired position without disturbing the alignment of the element. Each of the hydraulic clamping mechanisms for a particular machine tool element is serially interconnected with the power control mechanism in a manner to prevent the engagement of the controls while the elements are clamped and thus prevent possible damage to the drive mechanism associated therewith. The limits of movement of the elements are operatively controlled by means of a series of trip dogs in a well known manner. Driven directly from the fore end of the cross-feed screw, is an improved dial mechanism which enables the machine operator to read the amount of cross-feed movement in inches and thousandths of an inch. An adjustable zero mark is also provided to enable the operator to calculate movement of the head from any desired position thereof.

The invention is exemplified herein by means of a specially designed milling machine incorporating the inventive features. It is to be understood that the particular embodiment disclosed is intended to be illustrative only and that various other types of machine tools may incorporate various structural details disclosed herein which come within the range of equivalents of the features defined in the subjoined claims and which may be utilized in practicing the invention.

The foregoing and other objects of the invention which will become more fully apparent from the following detailed specification, may be achieved by the exemplifying machine tool depicted in and described in connection with the accompanying drawings, in which:

Fig. 3 is a schematic drawing of the gear train used in the machine shown in Figs. 1 and 2 to effect power or manual movement of the work supporting table and the tool retaining rotary head mechanism;

Fig. 4 is a horizontal sectional view taken on the plane represented by the lines 4—4 in Fig. 2 showing the counterweight system within the column and the spindle and feed drives to the rotary head;

Fig. 5 is a vertical sectional view of the cross-feed dial mechanism taken substantially on the lines 5—5 in Fig. 6;

Fig. 6 is an enlarged view of the rotary head cross-feed dial;

Fig. 7 is an enlarged view of the measuring device shown in Fig. 2 for precisely positioning the rotary head assembly on the machine tool saddle;

Fig. 8 is a fragmentary sectional view taken on the planes of lines 8—8 in Fig. 7 showing the actuating mechanism for the micrometer dial of the measuring device;

Fig. 9 is a view of the upright assembly with parts broken away to show the counterweight mechanism for the rotary head assembly slidably mounted on the upright;

Fig. 11 is a view in vertical section of the tripping post control mechanism taken on the line 11—11 in Fig. 10;

Fig. 12 is a schematic diagram of the complete gear train within the rotary head showing the two fixed-step transmissions for selectively driving either the quill or the cherrying device;

Fig. 13 is a vertical sectional view of a modified cherrying drum for the cherrying means especially adapted for elliptical cherrying operations, and taken on the plane of the lines 13—13 in Fig. 14;

Fig. 14 is a front elevational view of the face of the cherrying drum shown in Fig. 13;

Fig. 18 is a vertical section of the spindle and rotary head transmissions within the cross slide transmission adapted to drive the quill and cherrying means;

Fig. 19 is a vertical section taken on the plane of lines 19—19 in Fig. 18 and showing parts of the transmission drive to the quill and cherrying means;

Fig. 20 is an enlarged side elevational view, taken on the plane of the lines 20—20 in Fig. 19 and showing the controls on the rear side of the rotary head assembly;

Fig. 21 is a horizontal section taken substantially on the plane of lines 21—21 in Fig. 18 and showing the transmission train to the quill and to the cherrying means mounted in the cross slide transmission;

Figure 1:
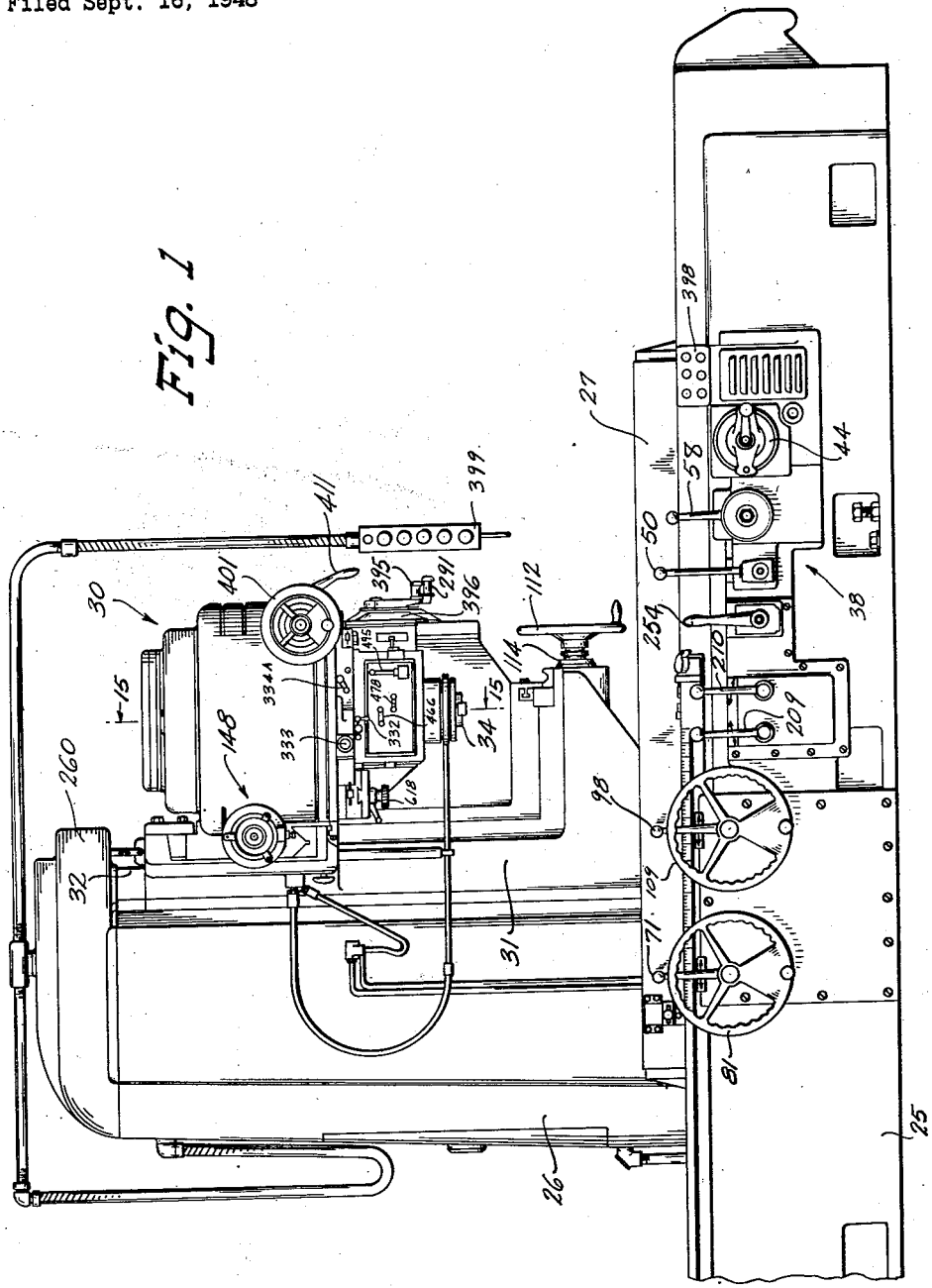
Figure 1 is a general view in front elevation of a milling machine incorporating the novel features of the invention hereinafter described.

Fig. 22 is a vertical sectional view of the cherrying means adapted to coordinate the movement of the quill and cross slide, and taken on the plane of the lines 22—22 in Fig. 21; and, Fig. 23 is a side elevational view of the cherrying means operably mounted on the side of the transmission and taken substantially on the plane of the lines 23—23 in Figs. 18 and 22.

The machine tool shown in the drawings as exemplifying structure constituting a preferred embodiment of the invention is generally similar to a bed type milling machine having a rotary tool supporting spindle mounted for gyratory movement slidably supported on the machine column. Various novel features of the invention disclosed herein may be incorporated in machine tools of other types with equal advantage.

Figure 2:
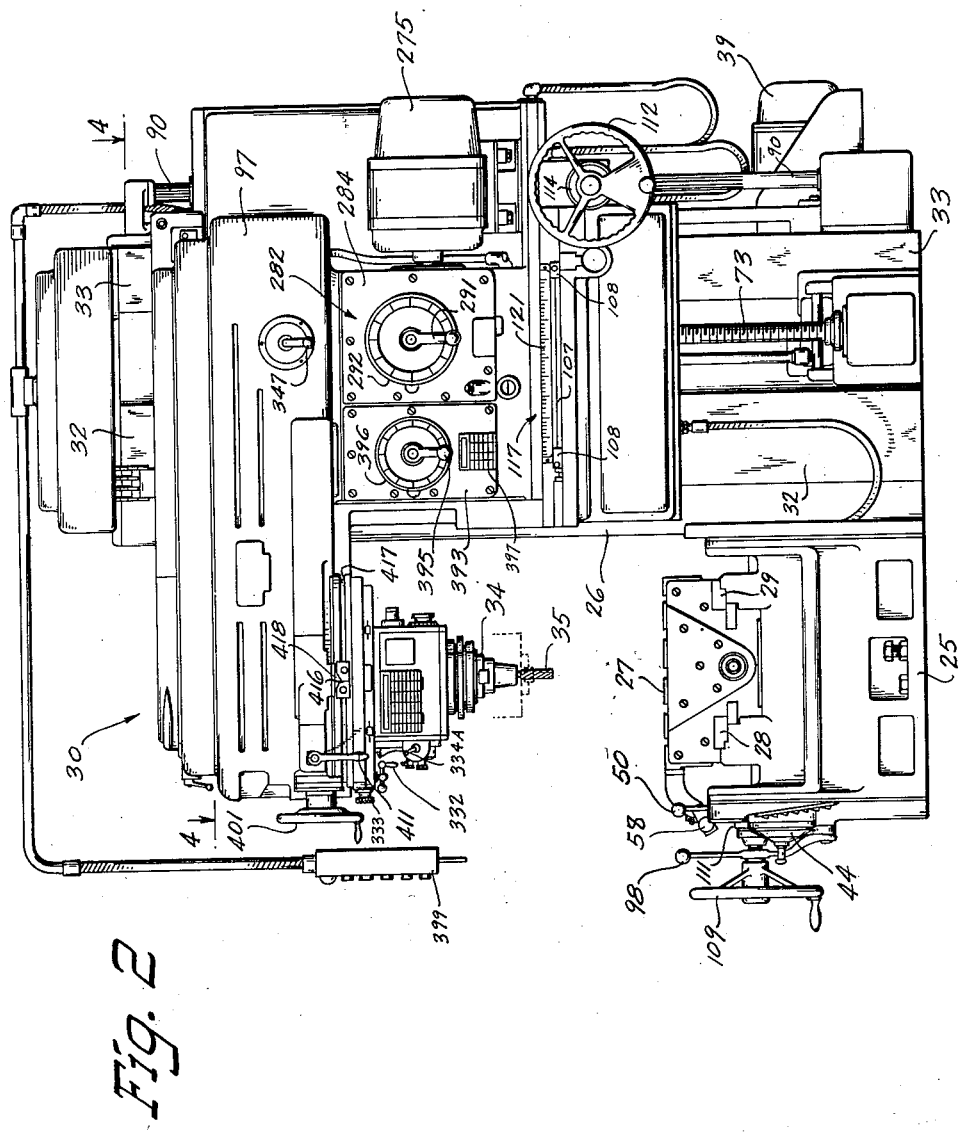
Fig. 2 is a right side elevational view of the milling machine shown in Fig. 1.

Referring more specifically to the drawings and more particularly to Figs. 1 and 2 showing general front and side views of the machine, a full and complete disclosure of an operative embodiment of the invention is hereinafter made. The machine comprises a base or bed member 25 and an upstanding column member 26 constituting the main frame of the machine upon which relatively movable work-supporting and tool-supporting members are operatively mounted. The work-supporting member consists of a table 27 disposed for longitudinal movement on a pair of way surfaces 28 and 29, as best shown in Fig. 2, attached to the top surface of the base or bed member 25. Appropriate transmission and control mechanism to be hereinafter more fully described, is operably connected to effect selective power movement of the table 27 on the bed 25 and provide for relative positioning of the table to a rotary tool-supporting spindle head 30 operatively mounted on the column 26.

The rotary head structure 30 is slidably mounted on a saddle member 31 for movement transverse to the plane of table movement. A pair of vertical way surfaces 32 and 33 on the side of the column 26 serve to alignably support the saddle 31 and provide for selective vertical positioning thereof on the column. Thus, a rotary spindle 34 operatively contained within the rotary spindle head 30 is disposed to carry any of a plurality of well known milling cutters such as the cutter 35, as shown in Fig. 2. The bodily movable spindle within the rotary head 30 is designed to be manually or power driven by means of an improved transmission and control mechanism which will be hereinafter more fully described. The general design and operation of the rotary head mechanism is generally similar to that shown in U. S. Patent No. 2,379,405 to Joseph B. Armitage. The rotary head mechanism is designed to effect the milling of intricate shapes including arcuately, angularly and conically shaped cuts, such as are needed in machining dies and the like. The gyratory machine tool spindle contained in the head may be predeterminately positioned or driven to effect intricate cuts of predetermined dimensions in accurately established relationships to one another on a workpiece.

In order to facilitate the description of the milling machine herein disclosed, the improved structure of the machine and the improved transmission and control mechanism for driving the movable work-retaining and tool-retaining elements thereof will be first described in detail and thereafter the structure and operation of the rotary spindle head will be described.

The table 27 slidably mounted on the bed 25 is power driven through a transmission and control mechanism 38 contained within the base 25 and the bottom of the upright column 26. Power for driving the movable members of the machine tool is derived from a motor 39 mounted on the lower rear side of the upright column 26, as shown in Fig. 2. As schematically shown in Fig. 3, the motor shaft is connected to drive a shaft 40 by means of a pair of bevel gears 41. The shaft 40 is journalled horizontally in the bed of the machine and serves to drive a pair of spur gears 42 which connect with and drive various gears in a fixed-step transmission 43. The various gears in the transmission are positioned to provide any one of a selected plurality of output speeds therefrom by means of a feed control mechanism 44 conveniently disposed on the front face of the bed 25, as shown in Fig. 1. The output of the transmission 43 is utilized in driving a reverser mechanism 45 operatively connected thereto. This mechanism includes a pair of gears 46 and 47 with a clutch element 48 operatively disposed between them. Each of the gears meshes with a corresponding gear operably keyed on a screw shaft 49 journalled in end brackets attached to the ends of the table 27 in a well known manner. Selective positioning of the clutch element 48 to the right or left of the neutral position shown in Fig. 3, serves to control the directional movement of the work retaining table 27.

Movement of the clutch is effected through the manipulation of a lever 50 operably mounted on the front of the bed 25, as shown in Fig. 1. When the lever 50 is moved rightwardly from the neutral position shown therein, the clutch element 48 is operatively connected with the gear 47 to effect rightward movement of the table 27, while selective manipulation of the lever 50 to the left of the neutral position shown, serves to connect the clutch 48 with the gear 46 and effect leftwardly movement of the table. The direction of table movement may also be automatically controlled through the engagement of predeterminately positioned trip dogs 51 with hydraulically operated trip plungers 52 and 53 in a manner to be hereinafter more fully described. Thus, the table 27 may be selectively driven in either direction at any one of a plurality of feed rates, as determined by the setting of the feed control mechanism 44.

One of the gears 42 also meshes with a gear 54, as indicated by the dotted line in Fig. 3, to provide a rapid traverse drive to the reverser mechanism 45. Selective operation of the table 27 at either feed or rapid traverse rates is controlled by selectively positioning the lever 50 in one of two positions in a plane of movement transverse to that aforedescribed. Such movement of the lever 50 actuates a rapid traverse clutch 55 whereby the rapid traverse gear train is rendered operative. Normally, the lever 50 is resiliently loaded to remain in the feed position whereby selective movement to the right or left of the position shown in Fig. 1 serves to effect feed movement of the table 27. When the lever 50 is moved leftwardly from the feed position shown in Fig. 2, the rapid traverse drive train is rendered operative to effect movement of the table 27 at rapid traverse rate in either direction, depending upon the selective sidewise positioning of the control lever.

Final precise positioning of the table 27 for use in positioning the workpiece relative to a cutter 35 is effected by means of an infinitely variable auxiliary positioning drive mechanism (not shown) such as disclosed in a patent application to Joseph B. Armitage and Frank Zankl, bearing Serial No. 753,258. This drive mechanism is geared to a shaft 56 shown in Fig. 3, which in turn is operably geared to the table screw shaft 49 via a pair of gears 57. The auxiliary drive mechanism is controlled from a manually operable lever 58, as shown in Figs. 1 and 2, readily accessible on the front of the bed 25. Hydraulic interlocks in the control circuit connected with the levers 50 and 58 serve to prevent the operation of the auxiliary drive mechanism whenever the table 27 is being power driven at either rapid traverse or feed rates.

Power from the motor 39 is also utilized in effecting selective movement of the rotary spindle head 30 in a vertical or horizontal plane, as aforedescribed. To this end, a take-off gear 60 keyed to the same shaft as the reverser mechanism 45 operably meshes with a spur gear 61 keyed to a shaft 62 which drives an over-running clutch element 63. Thus, the shaft 64 upon which the overrunning clutch 63 is operably mounted, is driven whenever the feed transmission is operating. However, when the shaft 64 is to be driven at rapid traverse rate, the overrunning clutch gear 63 meshes with a gear 65 constituting a portion of a hydraulically actuated rapid traverse clutch 66. The clutch 66 is actuated to an engaged position to drive the shaft 64 whenever the control lever 50 is manipulated, as aforedescribed. The rapid traverse clutch includes a gear 67 which meshes with a gear 68 keyed to the shaft 64, the arrangement being such that the engagement of the clutch 66 serves to overrun the clutch 63 and drive the shaft 64 at a rapid traverse rate, one half of the rate at which the aforedescribed table element 27 is driven. With this arrangement, the shaft 64 and its associated gearing rotatably journalled within the base 25 are constantly driven when the motor 39 is energized.

The shaft 64 is geared to drive an elevation reverser mechanism 69 and a cross-feed reverser mechanism 70, as best shown in Fig. 3. The elevation reverser mechanism is selectively operable through the manipulation of a control lever 71 which is operably linked to effectively shift the clutch element within the reverser mechanism 69 to either of the two extreme positions from the neutral position shown in Fig. 3. With the reverser mechanism thus positioned, various shafting and gearing 72 operably connecting with an elevating screw 73, is rotatably driven in either direction. The elevating screw 73 is rotatably journalled between the vertical ways 32 and 33 on the side of the column member 26, as shown in Fig. 2. The elevating screw 73 meshes with a nut 74 fixedly retained in the saddle member 31 in a well known manner whereby rotation of the elevating screw serves to effect vertical movement of the saddle 31 slidably mounted on the side of the column 26.

Manipulation of the control lever 71 rightwardly from the neutral position shown in Figs. 1 and 3, serves to operate a control linkage mechanism 75 connecting with a shifter fork 76 and thereby position the clutch to permit transmission of power through the transmission and the shaft 64 to the elevating screw 73 in a manner to effect downward movement of the saddle member 31. Whereas, the manipulation of the lever 71 leftwardly from the neutral position shown in Figs. 1 and 3, serves to actuate the shifter fork 76 in the elevation reverser mechanism 69 in a manner to effectively drive the elevating screw and cause the saddle member to be raised on the column 26. The control linkage mechanism 75 is also connected with an actuating rod 77 vertically disposed on the side of the column 26 in a manner to be selectively moved lengthwise thereof. The rod 77 extends through a bore 78 in an extending portion of the saddle 31 in a manner to engage either of two trip dogs 79 and 80 adjustably clamped on the actuating rod. The position of the trip dogs 79 and 80 determines the upper and lower limits, respectively, of vertical movement of the saddle 31. Engagement of the saddle 31 with either of the trip dogs, serves to axially shift the rod 77 and actuate the control linkage mechanism 75 to disengage the elevating reverser mechanism whereby further movement of the saddle 31 is interrupted. Thus, the saddle 31 supporting the rotary spindle head 30 may be selectively driven on the column 26 within predetermined limits at either feed or rapid traverse rates depending upon the selective manipulation of the control levers 50 and 71. Selective positioning of the lever 50 in the vertical plane serves to determine whether the saddle 31 is to be driven at either feed or rapid traverse rate, whereas selective manipulation of the lever 71 serves to determine the direction of movement of the saddle on the vertical upright 26.

The saddle 31 may also be raised or lowered on the way surfaces of the column 26 through the manual operation of a handwheel 81 rotatably disposed on the front of the bed, as shown in Fig. 1. The handwheel is disposed to drive a plurality of gears 82 which are connected to drive the reverser mechanism 69. Clockwise rotation of the handwheel 81, serves to drive the reverser mechanism to effect upwardly movement to the saddle 31 whereas counterclockwise rotation of the handwheel serves to effect downward movement of the saddle 31 on the column. The control lever 71 is mechanically disposed in a well known manner to prevent a manual manipulation of the handwheel 81 whenever the elevating screw 73 is being power driven. A dial 83, adjustably retained on the shaft supporting the handwheel 81, serves to indicate the amount of movement of the saddle member 31. The dial is so arranged that rotation thereof is effected whether the elevating screw 73 is being manually or power driven. In either case, a direct reading in thousandths of an inch of vertical movement of the saddle is possible.

Power for effecting movement of the rotary spindle head 30 on the saddle 31 in a horizontal plane, is also obtained from the motor 39 and the transmission mechanism 43, as aforedescribed. The shaft 64 is geared to drive the cross-feed reverser mechanism 70 which includes a selectively positionable clutch element 88. When the element is shifted upwardly or downwardly from the neutral position shown in Fig. 3, the reverser mechanism 70 will be clutched to drive shafting and gearing 89 rotatably disposed within the base 25 and the bottom of the column member 26; it is utilized to drive a splined shaft 90 rotatably journalled in brackets extending from the rear side of the column 26, as shown in Fig. 2. A gear 91 is splined to the shaft 90 and is rotatably retained within a gear case attached to the side of the saddle. With this arrangement, the gear 91 may be rotatably driven from the shaft 90 regardless of the vertical position of the saddle 31 on the column 26.

The gear 91 meshes with a gear 92 which is connected to drive a gear 93, as shown in Figs. 3 and 4. The gear 93 is disposed to drive a cross feed screw shaft 94 by means of a gear 95 keyed to the outer end of the shaft. A nut 96 shown in Figs. 3 and 4, is operatively retained in a rotary head casing 97 which contains the rotary spindle head 30. The nut may be adjusted to eliminate backlash between the nut and screw 94 in a well known manner.

Power operation of the cross-feed screw 94 is controllable from a control lever 98 operatively disposed on the front of the bed 25, as shown in Figs. 1 and 2. When the lever is moved rightwardly from the neutral position shown in Figs. 1 and 3, linkage mechanism 99 connected therewith is actuated to operate a shifter fork 101 shown in Fig. 3 which engages the clutch element 88 in the cross-feed reverser mechanism 70. This serves to transmit power to the cross-feed screw 94, as aforedescribed, and effect movement of the rotary spindle head assembly inwardly toward the saddle and column. Movement of the lever 98 leftwardly from the neutral position shown in Figs. 1 and 3, serves to actuate the clutch element 88 to provide transmission of power via the shafting and gearing 89 to the cross-feed 94 and effect outwardly movement of the rotary spindle head assembly 30. The linkage mechanism 99 for operating the cross-feed reverser 70, may also be actuated mechanically through the operation of one of a pair of plunger rods 105 and 106, as shown in Fig. 3. The rods are operably disposed in the saddle 31 and are designed to engage with a slide bar 107 constituting a portion of the control mechanism for the operation of the rotary spindle head 30. A pair of trip dogs 108 adjustably mounted on the slide bar 107 determine the range of power movement of the head. When either of the rods 105 or 106 are actuated through engagement with the trip dogs, as predeterminately positioned on the slide bar 107, the linkage mechanism is operated to effect disengagement of the power drive. The operation of the trip dogs 108 and the plunger rods 105 and 106 will be hereinafter more fully described.

The rotary spindle head assembly 30 may also be effectively moved in either direction on the saddle 31 through the manipulation of a handwheel 109 operably mounted on the front face of the bed 25, as shown in Figs. 1 and 2. Rotation of the handwheel serves to rotate a series of gears 110 which drive the reverser mechanism 70 and the shafting and gearing 89, as aforedescribed, with the direction of rotation serving to determine the direction of movement of the rotary spindle head assembly 30 on the saddle 31. The control lever 98 is mechanically designed to prevent the use of the handwheel 109 whenever the control lever 98 is out of the neutral position shown in Figs. 1 and 3. A second station at which the machine operator may effect manual cross movement of the rotary spindle head is provided on the right side of the column, as shown in Figs. 1 and 2. A handwheel 112 is provided on the side of the saddle 31 near the rear of the upright member 26. When this handwheel is rotated, it drives a pair of bevel gears 113, one of which is splined on the vertically disposed shaft 90, as shown in Fig. 3. The arrangement is such that the handwheel may be readily utilized to effect manual movement of the rotary head assembly regardless of the vertical position of the saddle 31 on the side of the column 26. A dial 114 adjustably positionable relative to the handwheel 112 permits the operator to more readily ascertain the position of the rotary spindle head assembly 30 on the saddle.

In order to enable the machine operator to readily determine the precise position of the rotary head on the saddle 31, an improved measuring device 117 is readily disposed on the side of the machine, as generally shown in Fig. 2 and detailedly shown in Fig. 7. With this device, it is possible to precisely position the head for each cutting operation required in machining a workpiece. A cross-feed scale pointer 118 is attached to the side of the rotary head and is disposed with a zero line 119 marked thereon which is readable through an aperture 120 against the markings of an adjustably mounted scale 121. The zero line may also be read against a permanent zero mark (not shown) stamped on the side of a slide bar 107 mounted for lengthwise movement on the side of the saddle 31. When all of the zero marks are in alignment, the rotary head assembly 30 is precisely positioned in the middle of the saddle 31. Movement of the rotary head from this position is indicated upon the scale 121. In order to facilitate certain machining operations, it may be advisable to shift the scale 121 a preselected distance. This is accomplished by means of a series of shifting slots 123 in the saddle 31 which are each adapted to receive a T-bolt disposed to adjustably support the scale 121, as shown in Figs. 7 and 8. Thereafter, the entire machining operation for some intricate work may be performed from an offset zero point. The offset zero thus established might possibly correspond to a scribe line on the workpiece from which it is desirable to start a given machining operation. With the scale 121 positioned in the central position shown in Fig. 7, power or manual cross movement of the rotary head 30 on the saddle 31, will bring one of the two trip dogs 108 into engagement with an extending lug 124 on the front face of the cross-feed scale pointer 118. Such engagement accomplishes an endwise movement of the slide bar 107 upon which the trip dogs 108 are mounted. Any movement of this bar serves to force one of the two plunger rods 105 and 106 inwardly and disengage the power drive at the cross-feed reverser mechanism 70, as aforedescribed, and thus serves to stop the power movement of the rotary tool head 31.

The slide bar 107 is retained in position by a tongue 125 integrally formed therewith and slidably fitted into a corresponding groove in the saddle 31, as shown in Fig. 8. The movement of the slide bar 107 is restricted to lengthwise movement in a plane parallel to the plane of rotary head movement. The trip dogs 108 are adjustably retained on a horizontal ledge 126 on the slide bar 107 and may be locked in any selected position by means of a T-bolt and nut 127 slidably positionable in a T-slot 128, in a well known manner. In setting up the trip dogs 108 to prescribe the limits of forward and rearward cross movement of the rotary tool head 30 on the saddle 31, the head is initially fed to a selected position and, thereafter, the dog 108 is positioned whereat an adjustable contact shoe 129 engages with the extending lug 124 on the scale pointer 118. Several trial runs are then made wherein the cross-feed screw 94 is power driven to effect engagement of the trip dog with the contact lug 124 and thereby determine the correctness of the trip dog setting. As shown in Figs. 7 and 8, the contact shoe 129 on the trip dog 108 is provided with an adjusting screw 130 which is used to position the contact shoe and thereby readily vary the position of the contact shoe 129 relative to the dog 108; thus the machine operator may precisely adjust the point of engagement between the shoe and the contact lug 124.

After one trip dog has been accurately positioned, the second trip dog is also positioned through the use of measuring rods and micrometer 131, as shown in Fig. 7. The measuring rods are operably retained in a trough 132 located, as shown in Fig. 8, in the middle of the horizontally disposed ledge 126 on the slide bar 107. By predeterminately setting the micrometer 131, the exact distance between the dogs may be set up and, thereafter, the contact shoe on the second trip dog 108 may be adjusted, as aforedescribed, to facilitate final precise adjustments thereof. The maximum lengthwise travel of the slide bar is limited through the engagement of an adjustable stop bolt 133 threadedly retained in each end of the slide bar 107 with a ledge 135 on the saddle 31. The bolt 133 is locked in position by a lock nut 134 and may be adjusted to permit lengthwise movement of the bar of sufficient magnitude to force the plunger rods 105 and 106 out of the groove in the slide bar with a minimum of endwise movement of the slide bar 107.

In order to furnish a precise reading of the position of the rotary head 30 on the saddle 31, a dial indicator 138 is provided and is operatively mounted in an aperture in the saddle 31. As shown in Figs. 7 and 8, the actuating stem 139 of the dial indicator is disposed to be engaged by a resiliently retained plunger 140. The top of the plunger constantly engages the ends of a pair of contact shoes or fingers 141 and 142. The arrangement being such that the contact shoe 141 constantly abuts against the left end wall in a groove 143 transversely machined in the bottom face of the slide bar 107, while the contact shoe 142 remains in constant engagement with the right side wall of the groove 143. A spring 144 retained beneath the plunger 140 serves to place a continuous pressure on the two contact shoes 141 and 142 shown and since the pressure on each of the contact shoes 141 remains equal, the slide bar 107 will be retained in the neutral position at all times. This resilient action serves to maintain the slide bar 107 in the centrally disposed position except when either of the trip dogs 108 engage the lug 124 to effect lengthwise movement of the bar. At that time, the additional pressure on one of the arms will serve to vary the pressure on the contact shoes 141 and 142 depending upon the direction of lengthwise movement of the slide bar 107. The amount of movement of the contact shoe will be readily reflected on the dial indicator 138. Thus, the machine operator could precisely adjust the trip dogs 108 to disengage the power drive to the cross-feed screw 94 at a predetermined point of rotary head movement on the saddle 31, and, thereafter, move the rotary head casing 30 through the manual manipulation of either of the handwheels 109 and 112 until a desired reading is obtained on the dial indicator to indicate the precise position of the rotary head assembly. After the rotary spindle head casing 30 is moved in the opposite direction, the resilient or springular means 144 will immediately take effect and impose an equal pressure on each of the contact shoes 141 and 142 to centrally reposition the slide bar 107. With this arrangement, the rotary head may be power fed to effect cross movement and positioning thereof as predeterminately required for a particular machining operation.

In order to afford the same advantage to the machine operator when controlling the cross movement of the rotary spindle head assembly 30 from the front of the machine, as shown in Fig. 1, through the manipulation of the control lever 98 and the handwheel 109, an improved dial mechanism 148 projecting from the front of the rotary head is provided, as shown in Figs. 1, 3 and 4. The dial mechanism is mechanically driven from an extending shaft 149 operably journalled in a housing 150 attached to the front of the rotary head 30 to align the shaft axially with the fore end of the cross-feed screw shaft 94, as shown in Fig. 3. The rearwardly extending end of the shaft 149 is splined or serrated for reception into a similarly splined or serrated internal opening (not shown) in the fore end of the screw shaft 94. Thus, any rotation of the screw shaft 94 is transmitted directly to the shaft 149 and a gear 151 keyed to the outer end thereof, as shown in Fig. 5.

The gear 151 meshes with a gear 152 integrally formed on a shaft 153 rotatably journalled in the housing 150 and in a supporting cover member 154. A supporting disc 155 is keyed to the extending end of the shaft 153 and serves to concentrically support a dial member 156. The dial 156 may be locked for unified rotation with the disc 155 and the shaft 153 by means of serrations 157 provided on each of the members. A spring 158 disposed between the dial member 156 and a backing plate 159 attached to the outer end of the shaft 153, serves to normally retain the dial member 156 in engagement with the serrations and thus provide for normally driving the dial from the shaft 149. The dial 156 is provided with indicia 160 which indicate movements of the rotary head assembly 30 on the saddle 31 in thousandths of an inch when read against a fixed zero mark 161 on the cover 154. Thus, the operator may effect precise increments of movement of the rotary head 30 at either of the power feed rates through the manipulation of the control lever 98 or manually through the manipulation of the handwheel 109 and readily observe the amount of movement by reading the dial member 156.

In order to readily ascertain the general position of the rotary head 30 on the saddle 31, a second dial 164 is provided bearing indicia 165 which is readable against the zero mark 161. The distance indicated by the indicia 165 is equivalent to the distance indicated on the scale 121 previously described as representing the maximum cross-feed travel of the rotary head 30. When the zeros on the dials 156 and 164 are in alignment with the stationary zero mark 161, the rotary head spindle is centrally disposed relative to the table 27 and the rotary head 30 may be moved an equal distance from this point to the maximum range of rotary head movement.

An epicyclic gearing arrangement 166, as detailedly shown in Fig. 5, is utilized to precisely synchronize the operation of the two dials 156 and 164. A gear 167 having an eccentric hub opening is mounted on an eccentric 168. This gear meshes with an internal gear 169 fixedly anchored to the housing 150 to prevent rotation thereof. The gear 167 also meshes with an internal gear 170 integrally formed on the dial 164. The fixed internal gear 169 has one tooth less than the dial gear 170. The rotation of the eccentric 168 when driven from the shaft 153 serves to effect rotation of the gear 167 around the inside of the fixed internal gear 169. The ratio in the various epicyclic gearing 166 is such that the outer dial 164 will indicate an indicia advancement of two indicia increments for each complete rotation of the inner dial 156. In order to facilitate setting up certain types of machining operations, an adjustable zero rider 171 is shown adjustably mounted on the outer periphery of the housing 150 and the cover member 154, as shown in Figs. 5 and 6. The rider 171 is mounted for arcuate adjustment by means of a retaining pin 172 slidably mounted in an arcuate slot 173, with a thumb screw 174 serving to lock the rider in any adjusted position. The use of the rider may be utilized when it is found feasible to work from a particular scribe line on the workpiece. At that time, the machine operator would merely need to adjust the rider to read on a particularly setting of the outer dial 164 when the rotary head 30 was positioned for starting the machining operation at a particular offset point on the workpiece. Thereafter, all settings could be determined from the adjusted zero position.

The power feed mechanism is hydraulically controlled to provide precisely controlled movement of the movable elements of the machine including the work retaining table 27, the saddle 31 on the upright 26 and the rotary head mechanism 30 on the saddle, as aforedescribed. The hydraulic system of control herein utilized is similar to that disclosed and described in Patent No. 2,407,913 to Joseph B. Armitage and Orrin W. Barker, dated September 17, 1946.

Figure 10:
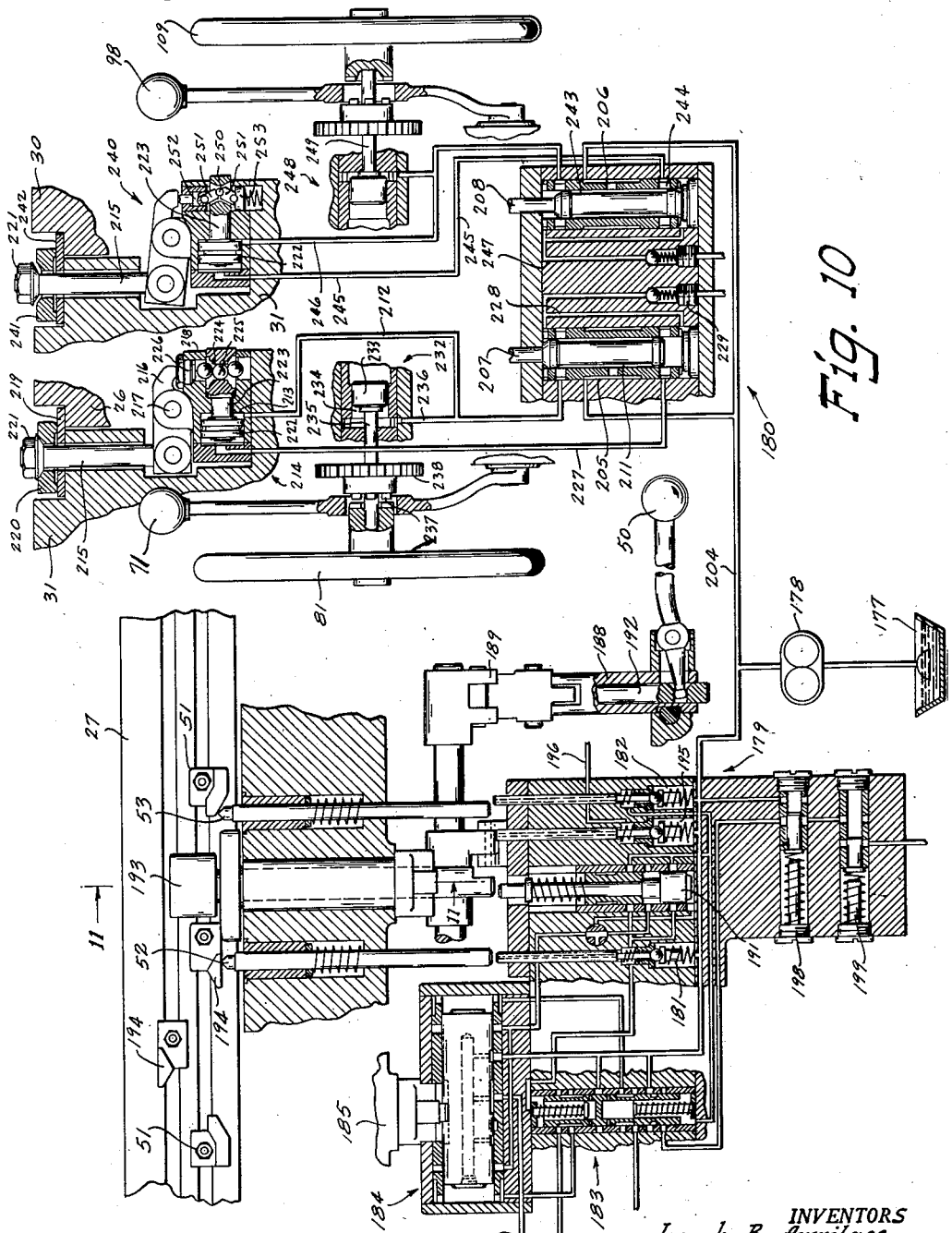
Fig. 10 is a schematic diagram of the hydraulic control circuit for the power drive mechanism and the clamping mechanism of the milling machine.

The hydraulic control system for the machine tool herein described is shown in Fig. 10. Hydraulic fluid is pumped from a sump 177 through a pump 178 to a control circuit 179 and a clamping circuit 180. Since the control circuit 179 has been described in detail in the aforementioned patent, this circuit will be generally described herein to show the operation of the machine. The reversal of table movement is controlled through the engagement of trip dogs 51, predeterminately positioned on the table 27, with reverser plungers 52 and 53 which are operative on automatic poppet valves 181 and 182, respectively. The poppet valves 181 and 182 serve to control a reversal in the direction of table movement by effecting operation of a reverse or pilot valve 183. The operation of the reverse or pilot valve 183, in turn, controls the operation of the reverse shifter valve 184. As shown in Figs. 10 and 11 (Fig. 11 on same sheet with Fig. 3), the axial movement of the shifter valve 184 serves to operate a mechanical shifting mechanism 185 disposed to operate a shifter fork 186. The fork 186 engages the clutch element 48 intermediately disposed in the table reverser mechanism 45, as shown in Fig. 3. The direction of table movement may also be manually controlled through the manipulation of a table control handle conveniently disposed on the front of the bed 25, as shown in Fig. 1. When the lever 50 is shifted rightwardly from the neutral position shown, it serves to effect rightward movement of the table 27 while, if it is shifted leftwardly from the neutral position, it serves to effect leftward movement of the table 27. Such movements serve to operate a sleeve 188, as shown in Fig. 10. The sleeve 188, in turn, connects with a linkage and gearing mechanism 189. This mechanism meshes with a sectional gear 190, as shown in Fig. 11, operatively disposed to effect sidewise movement of the shifter fork 186 and thereby shift the clutch element 48 to either of two driving positions or to a neutral intermediate position and thus control the power movement of the table 27 in either direction.

Both of the reverse poppet valves 181 and 182 operate in conjunction with a rate selector valve 191 which determines the rate of movement of the movable elements in the machine. The axial position of the valve determines whether the elements are to be driven at one of the preselected feed rates or whether they are to be driven at rapid traverse rate. When the control handle 50 shown in Figs. 1 and 10 is pivotally moved in a vertical plane, it serves to effect axial movement of a pilot rod 192 shown in Fig. 10. This pilot rod, in turn, effects selective positioning of a rate selector tripping post 193, as shown in Figs. 10 and 11. The bottom of the tripping post engages the stem of the rate selector valve 191 in a manner to control the hydraulic fluid flow through certain of the valves and thus effect movement of the table 27 at either feed or rapid traverse rates. The operation of the tripping post 193 may be automatically effected through engagement with rate change trip dogs 194 carried on the front of the table 27 and disposed to engage the tripping post at predetermined points of table travel. If the rate selector valve 191 is positioned to provide for rapid traverse movement, a rapid traverse valve 195 is rendered operative to permit fluid flow via a line 196 to the rapid traverse clutch. When fluid is directed to the clutch, it is rendered operative to drive the reverser mechanism assembly 45 at rapid traverse rate and effect movement of the table 27. As shown in Fig. 3, the line 196 also connects with another rapid traverse clutch 66 previously described as controlling the rapid traverse movement of the rotary head assembly 30 and the saddle 31 at one half the rapid traverse drive rate provided for the table 27. The reverse shifter valve 184 is arranged to permit fluid flow via a line 197 to the positioning device (not shown) previously mentioned and more fully described in the aforementioned U. S. Patent application, Serial No. 753,258, now patent No. 2,764,067, granted September 25, 1956. A high pressure valve 198 and a low pressure valve 199 both automatically operable, serve to control the pressure in the hydraulic control lines upon predetermined occurrences of valve operation and also serve to effect the complete operation of the various mechanisms aforedescribed. The hydraulic fluid flowing from the valves 198 and 199 is directed into the machine lubricating system.

An improved hydraulic clamping system is hereinafter disclosed which serves to precisely clamp the movable tool retaining members of the machine tool without causing any distortion between the members during clamping. As shown in Fig. 10, the hydraulic clamping circuit 180 is completely independent of the hydraulic control circuit 179. The hydraulic fluid from the pump 178 is directed through a line 204 to central ports 205 and 206 in the elevating clamp control valve 207 and the cross-feed clamp control valve 208. The valve 207 is selectively controlled from a control lever 209 while the control valve 208 is controlled from control lever 210. Each of these levers is conveniently disposed on the front face of the bed 25 adjacent to the elevating handwheel 81 and the cross-feed handwheel 109, as shown in Fig. 1. When the levers are in the vertical upright position therein shown, the clamping mechanism is inoperative and the movable elements of the machine may be power driven in either direction. However, when either of the control levers are manipulated sidewise from the vertical position, they serve to operate the clamp control valves 207 and 208 to effect clamping of either the saddle 31 on the vertical upright 26 or of the rotary head assembly 30 on the saddle 31.

For example, as shown in Fig. 10, the elevating clamp control valve 207 is shown in the uppermost position whereat the central landular portion 211 of the valve is positioned to permit hydraulic fluid fllow from the central port 205 to a line 212. This line connects with the right end of a cylinder 213 constituting a portion of a hydraulic saddle clamping mechanism 214. Within the saddle, a plurality of these clamping mechanisms are appropriately positioned to effect clamping between the saddle 31 and the vertical head 26. Since each of these clamping mechanisms are identical in structure, only one is shown operatively disposed in relation to the elevating control valve 207. It is to be understood that each of the saddle clamping mechanisms are rendered hydraulically operative through parallelly connected hydraulic lines extending from the control valve 207. The number of saddle clamping mechanisms required in a particular structure is dependent upon the size of the machine and the weight of the movable element which is to be clamped.

Since all of the saddle clamping mechanisms are identical in structure only one will be described in detail. Each clamping mechanism is bodily contained in the saddle 31 and includes a clamping bolt 215 which is pinned to a toggle arm 216. This arm, in turn, is operatively retained on a pin 217 anchored in the frame 218 of the clamping mechanism. The clamping bolt 215 extends through aligned holes in a bearing plate 219 and in a clamping plate 220. A nut 221 threadedly retained on the outer end of the clamping bolt 215 permits precision and uniform adjustment of each of the clamping mechanisms. With the bearing plate 219 resting on abutting flush portions of the upright member 26 and the saddle member 31, any clamping pressure applied to the clamping plate 220 through the clamping bolt 215 will effectively clamp the saddle relative to a preselected position on the upright member 26 and will retain such a movable member in a clamped position until the saddle clamp mechanism 214 is rendered operative to release the clamping bolt 215.

The actuating means of the clamping mechanism includes a hydraulically operable piston 222 in the cylinder 213 attached to a connecting rod 223. The rod 223 has a bore 224 transverse to the plane of rod movement which retains three hardened balls 225. The bottom one of the three balls 225 is seated in the frame portion 218 while the upper ball is seated in an axially movable tappet 226. The opposite end of the tappet 226 is engaged by the end of the toggle arm 216 opposite that connecting with the clamping bolt 215. As shown in Fig. 10, the center ball has been shifted through the leftward movement of the piston 222 and the connecting rod 223 beyond the vertical center line of the top and bottom ball and, consequently, upward pressure has been applied to the tappet 226 into the right hand arm of the toggle 216. The exertion of pressure on this end of the toggle arm 216 causes the clamping bolt 215 attached thereto to be drawn downwardly whereby a uniform pressure is applied to the clamping plate 220 and the bearing plate 219. Thus, a bearing pressure is applied to a portion of the surface of the movable saddle member 31 in a manner to rigidly clamp it to the vertical upright 26. Since the center ball in the actuating means of the clamping mechanism 214 has been moved beyond the vertical center line of the upper and lower ball, clamping pressure will remain to retain the movable saddle 31 in a clamped position even though the hydraulic pressure is fully released into the right end of the cylinder 213.

However, if the operator wishes to unclamp the saddle, he need only return the control lever 209 on the front of the machine to the aforementioned vertical position whereat the elevating clamp control valve 207 will be actuated downwardly. In this position, the hydraulic fluid from the port 205 is directed via the landular portion 211 to a line 227 connecting with the left end of the cylinder 213. The admission of hydraulic fluid into this end of the cylinder will force the piston 222 and the rod 223 rightwardly and thereby shift the center ball rightwardly until the upward pressure is relieved on the tappet 226. Consequently, pressure on the clamping bolt 215 and the clamping plate 220 will be relieved to again permit power movement of the saddle along the vertical ways on the upright 26. A line 228 connecting with the end ports of the control valve 207, serves to drain off the fluid from the cylinder 213 and the connecting lines 212 and 227. A relief valve 229 connected to the line 228 limits the amount of drainage to the hydraulic fluid remaining in the cylinder 213 and thus prevents the lines 212 and 227 from being completely drained.

In order to prevent the inadvertent application of power to the elevating screw 73 while the saddle 31 is clamped to the upright 26, an interconnected hydraulic actuating motor 232 is provided. This valve is disposed in the bed 25 and includes a hydraulically actuated piston 233 mounted in a cylinder 234 which is in coaxial alignment with a shaft 235, and serves to prevent the accidental application of power when the members are clamped. As shown in Fig. 10, a line 236 connecting with the line 212 serves to conduct hydraulic fluid into the left end of the cylinder 234 whenever the elevating clamp control valve 207 is actuated to provide clamping of the saddle to the upright 26. When this occurs, the hydraulic fluid in the cylinder 234 forces the piston 233 rightwardly together with the shaft 235 attached thereto. Since the handwheel 81 is rotatably mounted on the shaft 235, it will be drawn rightwardly with the shaft 235 to a position shown in Fig. 10, whereat the control lever 71 cannot be shifted rightwardly or leftwardly to institute a power drive to the elevating screw 73. However, at this time, it is still possible to engage the clutch teeth 237 on the handwheel 81 and on the hub of a gear 238 rotatably mounted on the shaft 235. Since it is not possible to exert sufficient manual force on the handwheel 81 to manually move the saddle 31 along the way surfaces of the upright 26, this is of no consequence. Whenever the control valve 207 is shifted from the clamping position, the hydraulic fluid remaining in the left end of the cylinder 234 will be exhausted through the lines 236 and 212 via the line 228 and the relief valve 229. At that time, the exertion of manual pressure will permit the operator to pull the handwheel 81 axially to the left from the position shown in Fig. 10 a sufficient distance to permit the control lever 71 to be operated, as aforedescribed. This arrangement provides a safety interlock to prevent the application of power to the drive designed to move the saddle 31 on the upright 26 while the clamps are hydraulically energized to clamp the two members together.

A set of parallelly interconnected rotary head clamping mechanisms 240 are provided to hydraulically clamp the rotary head assembly 30 in any selected position on the saddle 31. A modified form of clamping mechanism operative in the same manner as those aforedescribed for clamping the saddle are provided to effect head clamping. All of the head clamping mechanisms 240 are identical in structure and, consequently, only one is shown in detail in Fig. 10. The clamping bolt 215 in the clamping mechanism 240 is provided with an adjustable nut 221 in a manner to engage the clamping plate 241. Whenever clamp-pressure is imparted to the plate 241, it will in turn impart pressure to the bearing plate 242 resting on a portion of the saddle 31 and the rotary head 30. Since the two surfaces to be clamped on each of the members 30 and 31 are flush, the bearing pressure applied by the plate 241 will be equal on both members and thereby effect a uniform clamping action along the entire clamping surface. The operation of the hydraulically actuated clamping mechanism 240 is somewhat similar to that previously described in conection with the saddle clamping mechanism 214 except that the hydraulically actuated linkage mechanism is varied. As shown in Fig. 10, the piston 222 and the rod 223 is shown in the extreme right hand position whereat the clamping mechanism is fully released.

The head clamp control valve 208 as shown in Fig. 10, is in a down position whereat hydraulic fluid from the line 204 and the port 244 which is connected via a line 245 to the left end of the cylinder in the head clamping mechanism 240. Hydraulic fluid in this end of the cylinder serves to retain the piston 222 in the right hand position whereby the rotary head 30 is unclamped from the saddle 31. At this time, the hydraulic fluid in the right end of the cylinder is drained via a line 246 into the upper end of the cylinder, constituting a position of the control valve 208 and thence into an exhaust line 247 connected to the sump 177. At the same time, the interconnected actuating motor 248 is exhausted to permit the operator to draw a shaft 249 supporting the cross feed hand wheel 109 outwardly into an operable position whereat the operator is free to manipulate the cross feed control lever 98 and provide a power drive to the cross feed screw 94 as aforedescribed. At any time while the head 30 remains unclamped, the operator can move the hand wheel 109 inwardly into clutching engagement and effect selective movement of the rotary head assembly 30 in either direction through the manual rotation of the hand wheel in a well known manner.

If it is necessary to hydraulically clamp the rotary head 30 to the saddle 31, the lever 210 on the front of the machine as shown in Fig. 1, must be manipulated rightwardly to operate the head control valve 208 in a manner to direct the hydraulic fluid from the central port 206 to the upper port connecting with the line 246. The hydraulic fluid will actuate the actuating motor 248 as aforedescribed to prevent the manipulation of the control lever 98 and the consequent transmission of power to the cross feed screw 94; the fluid will also serve to actuate the rotary head clamping mechanism 240. This serves as a safety interlock to make it impossible to connect the power drive and effect power movement of the rotary head assembly 30 on the saddle 31 while the clamping mechanism is actuated to clamp the two members together. When this occurs, the hydraulic fluid will enter the right end of the cylinder and force the piston 222 and the connecting rod 223 leftwardly. This movement will shift a crank pin 250 journalled in the end of the connecting rod 223 in the same direction and force a pair of actuating arms 251 beyond the center position whereat they serve to impart an upwardly clamping action to a slidably mounted tappet 252 operatively engaged by the upper arm 251. Upwardly movement of the tappet 252 serves to effectively actuate the clamping bolt 215 in a manner to expend clamping pressure on the plates 241 and 242 and thus clamp the rotary head to the saddle 31. A resiliently retained piston 253 is disposed in a cylinder transverse to that containing the connecting rod 223. Normally the piston 253 is resiliently forced upwardly to retain the piston against the lower of the two actuating arms 251. However, when hydraulic fluid is admitted to impart movement to the piston 222 and the connecting rod 223, the piston 253 will be forced downwardly as the crank pin 250 and the actuating arms 251 pass the center position from the clamped to the unclamped position or vice versa. This action serves to impart a positive snap action to the clamping mechanism 240 and to retain the tappet 252 in either of two positions.

In order to more readily describe the operation of the hydraulic clamping circuit 180, the positions of each of the clamp control valves 207 and 208 has been shown in Fig. 10 at opposite extremes whereby the saddle clamping mechanism is shown to provide clamping of the saddle while the rotary head clamping mechanism 240 is shown positioned to provide unclamping of the rotary head 30. As shown in Fig. 1, clamping of the table 27 is effected through the manipulation of a control lever 254 on the front of the bed 25. This lever is designed to operate a mechanical clamping mechanism (not shown) which is disposed in the bed in a manner to clamp the table 27 in any desired position in a well known manner.

An improved type of counterbalance means was adapted in the construction of the machine to support the massive saddle and rotary head assembly on the upright member 26. Ordinarily, counterweighted cables or chains were utilized to support a large movable element on a machine tool in a manner which required an excessively large counterbalance.

In order to provide ease in movement of the heavy saddle and rotary head assembly on the vertical way surfaces 32 and 33 of the upright 26 and reduce the size of the transmission required to effect vertical movement thereon, an improved counterbalancing means 255, as shown in Figs. 4 and 9, was designed to provide a two to one mechanical advantage. The saddle 31 is attached to the counterbalance means 255 by means of a link chain 256 operably supported on a pair of sprocket wheels 257 and 258. The sprocket wheel 257 is keyed to a shaft 259 journaled near the top foremost edge of a cover member 260 bolted on the top of the vertical upright 26. The other sprocket wheel 258 is keyed to the right end of a shaft 261 journalled at each end in the cover member 260, as shown in Fig. 4. A small counterweight 262 attached to the inner end of the link chain 256 serves to keep the chain taut on the sprocket wheels 257 and 258.

Two additional sprocket wheels 263 and 264 are keyed in spaced relationship to the shaft 261 with link chains 265 and 266 operably mounted on the sprocket wheels 263 and 264, respectively, serving to support a counterweight 267. Because of the aforedescribed arrangement, the weight of the counterweight 267 is reduced inversely to the mechanical advantage or approximately one-half in this case. As shown in Fig. 9, this counterweight is disposed for vertical movement in a recess 268 in the upright column member 26. A second pair of counterweights 269 and 270 are carried on the other ends of the chains 265 and 266, respectively. With this arrangement, the counterweight 267 counterbalances the weight of the saddle and head assembly at all times. As viewed in Fig. 9, the counterweight 267 serves to impart a counterclockwise movement, as indicated by the arrow 271, to the shaft 261 at all times, which is balanced out by the opposite force imparted through the link chain 256 because of the weight of the saddle and head assemblies 31 and 30.

The foregoing description of the various improved portions of the machine tool disclosed herein all relate to the bed and upright structure and to the transmission and control mechanisms utilized to effect movement of the work-retaining and tool-retaining members. It is to be understood that any of these features may be readily adapted to other types of machine tool structures with equal facility and purpose.

The rotary spindle head assembly 30 heretofore generally referred to, is basically of the same type as that disclosed in Patent No. 2,379,405 to Joseph B. Armitage, dated July 3, 1945. A milling machine utilizing this type of rotary head is especially adapted to perform intricate machining operations on dies and the like wherein the tool is mounted for complex gyratory bodily movements. In this manner, angular, circular and arcuate machining operations may be performed upon a workpiece with comparative ease and with an extreme degree of accuracy. The machine is highly versatile and is capable of precise manipulation in effecting cuts of an intricate and precise contour within the limits of the machine, such as parabolic, conodial and other intricate forms generally found in dies.

Figure 15:
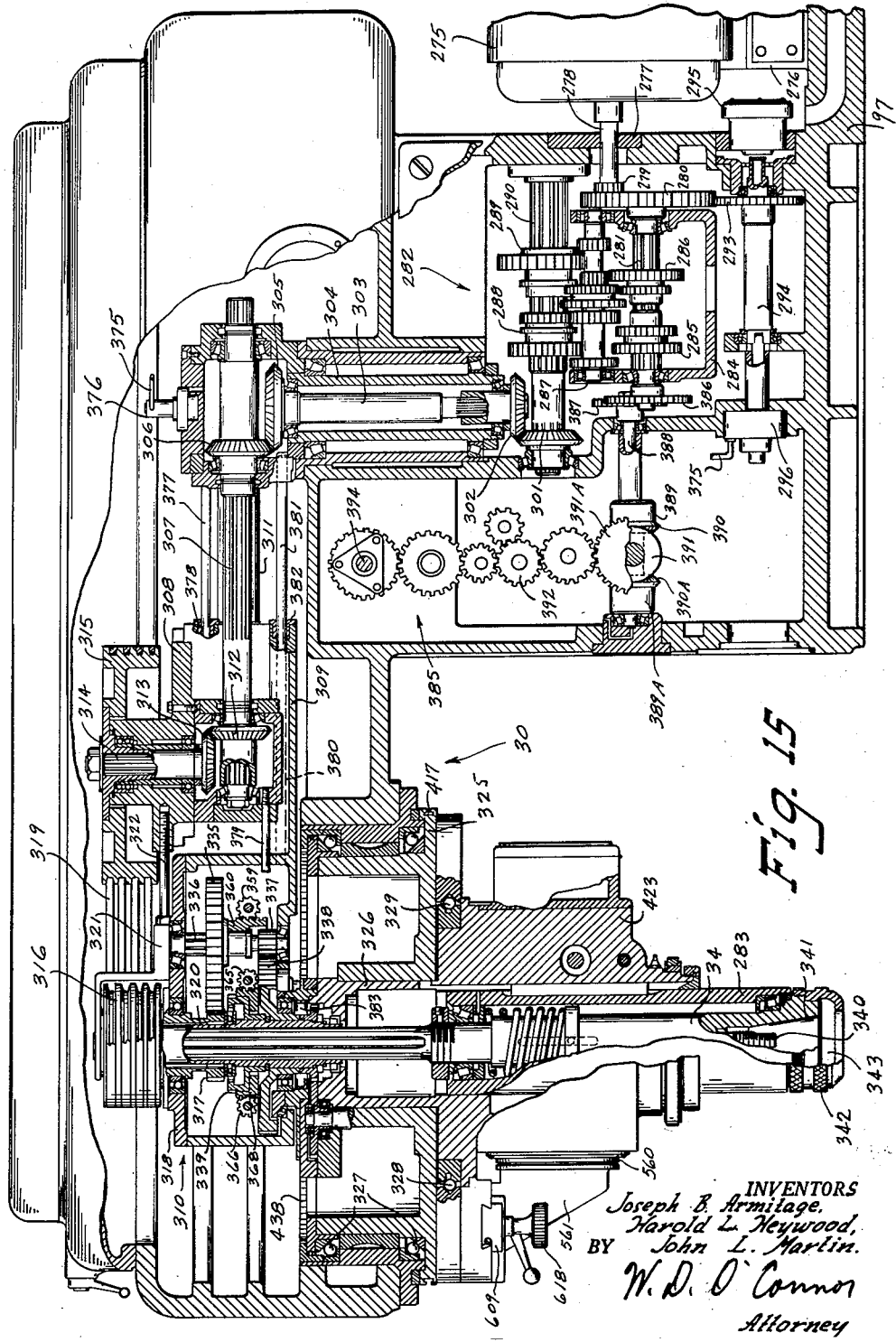
Fig. 15 is a vertical sectional view taken on the plane of lines 15—15 in Fig. 1, showing the entire spindle drive from the motor to the tool retaining spindle.

As best shown in Figs. 1 and 2, the rotary head assembly 30 slidably mounted for operation relative to the work retaining table 27, is a self-contained unit which is readily accessible from the front or side of the machine, as may be required during a particular milling, boring, or other machining operation. An independent power source is provided to effect power operation of the rotary head assembly 30 from a motor 275, as shown in Figs. 2, 4 and 15. The motor 275 is mounted on a vertical bracket 276 constituting a part of the rotary head casing 97. The bracket 276 is disposed to provide for vertical adjustment of the motor 275 thereon. A cam plate assembly 277 adjustably and eccentrically mounted in the casing 97 radially permits the operator to accurately align the motor 275 with the drive shaft 278 and pinion 279. With this arrangement, the relative poistion of the shaft 278 and the pinion 279 remains unchanged, even though it may be necessary to interchange motors having different types of frames. The motor 275 is utilized to effect rotation of the spindle, to effect axial movement of the quill, to effect precision rotation of the rotary head within the rotary head assembly 30, and to drive a cherrying device. The motor driven pinion 279 meshes with a gear 280 keyed to the end of a secondary shaft 281 in a spindle speed transmission 282 housed within the rotary head casing 97. The cam plate 277 adjustably mounted in the casing 97 and disposed to align the motor shaft 278, serves to insure proper spacing between the pinion 279 and the gear 280 regardless of the possible variations in the mounting dimensions of the drive motor 275. Thus, if the over all dimension from the center of the motor shaft 278 to the mounting face of the motor casing varies, it is merely necessary when installing the motor to rotate the cam plate 277 until the proper meshing relationship between the gears is obtained, and thereafter bolt the motor in position on the bracket 276.

The spindle speed transmission 282 serves to provide a variable power drive to drive the tool retaining spindle 34 and provide a power feed for raising and lowering the quill 283 rotatably supporting the spindle 34, as shown in Fig. 15. The gear 280 and the secondary shaft 281 are rotatably mounted in a transmission speed box 284 removably mounted in the side of the rotary head casing 97, as shown in Fig. 2. Thus, the entire spindle speed transmission 282 may be readily removed for purposes of repair or adjustment in a well known manner. A pair of gear clusters 285 and 286 slidably splined on the secondary shaft 281, are disposed to be selectively meshed with corresponding gears keyed to an intermediate shaft 287. The gears on the intermediate shaft 287 in turn, are selectively meshed with the gears on another pair of gear clusters 288 and 289, slidably splined on a primary shaft 290 journalled in the rotary head casing 97. The four gear clusters 285, 286, 288 and 289, are selectively positioned through the manipulation of a crank 291 operably disposed on the outside of the speed box 284 and operably connected to a speed selection mechanism (not shown) in a well known manner, as shown in Fig. 2. The speed setting of the transmission at any given time, may be read from a dial 292. It is apparent that when one of the gears on either of the clusters 285 and 286 is disposed for meshing relationship and likewise one of the gears of the clusters 288 and 289 is disposed in meshing engagement, a power drive is completed to the primary shaft 290, and by selectively varying the position of the gears in a well known manner, the primary shaft may be driven at any one of sixteen speed rates. As shown in Fig. 15, the gear 280 also meshes with a gear 293 keyed to drive a shaft 294 connected to an electrical plugging switch 295 and an oil pump 296. The plugging switch 295 is electrically connected to control the operation of the motor 275 and to plug it to stand still in a well known manner while the pump 296 is utilized to provide pressurized lubrication to the various moving parts within the rotary spindle head assembly 30.

As shown in Fig. 15, power from the spindle speed transmission 282 is transmitted via a bevel gear 301 to a bevel gear 302 splined to the lower end of a shaft 303. The shaft 303 is journalled in an upright position in a pilot carrier or swivel bracket 304 which, in turn, is likewise journalled for pivotal movement in the rotary head casing. A bevel gear 305 fixedly attached to the upper end of the shaft 303, meshes with and drives a bevel gear and sleeve assembly 306 rotatably journalled in a horizontally plane within the pilot carrier 304 and disposed for sliding splined engagement with a splined shaft 307. As shown in Fig. 4, the pilot carrier 304 is pivotally operable to provide a power drive to the rotary head mechanism hereinafter more fully described regardless of the position of said mechanism in effecting a gyratory movement of the tool retaining spindle 34. The sliding range of the shaft 307 within the gear and sleeve assembly 306 is sufficient to cover the entire range of rotary head movement.

The other end of the splined shaft 307 is rotatably retained in a pulley bracket 308, which is slidably mounted for movement in a plane parallel to the plane of movement of the splined shaft 307 on horizontal way surfaces provided on a spindle range change transmission case 309 operably containing and constituting a part of a range change transmission 310. A pair of parallely disposed guide bars 311 having one end anchored in the pulley bracket 308 are slidably retained in the pilot carrier 304 and serve to provide rigidity and smoothness to the interaction of the spindle head drive elements. A bevel gear 312 splined to the end of the shaft 307 contained within the pulley bracket 308, meshes with a gear 313 integrally formed on the lower end of a shaft 314 rotatably journalled in the bracket 308 and operably supporting a pulley 315. Thus, the pulley 315 is power driven directly from the spindle speed transmission 282.

A second multiple-groove pulley keyed to a sleeve and gear member 317 is rotatably journalled in a cover plate 318 attached to the top face of the range change transmission case 309, as shown in Figs. 4 and 15. The axis of rotation of the pulley 316 coincides with the axis of rotation of the spindle 34, as shown in Fig. 15. A plurality of V-belts 319 serve to transmit the power from the pulley 315 to the pulley 316. The gear portion of the member 317 is rotatably supported on a driving sleeve 320 which is internally splined to receive the upper splined portion of the tool retaining spindle 34. Since the sleeve 320 is rotatably mounted in the spindle range change transmission 310 and operably restrained against axial movement, it serves to provide a driving connection to the spindle 34 regardless of the axial movement of the spindle and quill assembly. The spindle range change transmission 310 includes a range change mechanism for driving the tool retaining spindle 34 from the pulley 316 in either a high speed range or a low speed range. Since the spindle speed transmission 282 is designed to provide a power drive at any one of sixteen speed rates, the addition of the range change transmission 310 serves to double the number of speed rates at which the tool spindle 34 may be driven.

Tensioning of the belts 319 on the pulleys 315 and 316 is effected through a tensioning means including an anchoring block 321 integrally formed on the top of the cover plate 318 and a tensioning adjusting screw 322 threadably retained in the pulley bracket 308, as shown in Figs. 4 and 15. Since the other end of the screw 322 is adjustably retained in the anchor block 321, any rotation of the screw serves to effect movement of the pulley 315 rotatably supported in the pulley bracket 308. Thus, the tension of the belts may be readily varied without materially varying the range of movement of the splined shaft 307 within the swivel bracket 304.

Figures 16, 17:
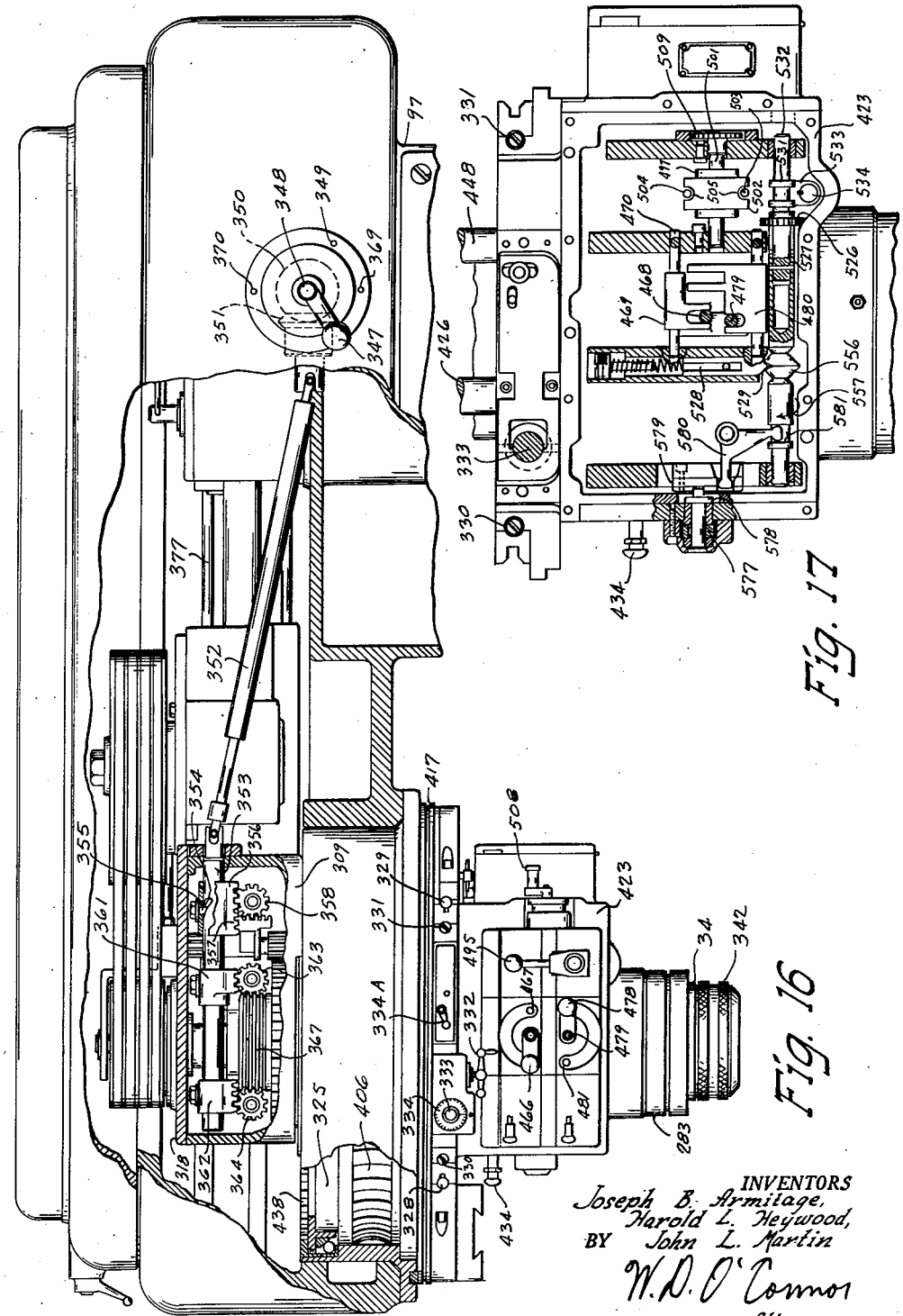
Fig. 16 is a side elevational view of the rotary head assembly with parts broken away to show the control mechanism for shifting the range change gearing within the rotary head.
Fig. 17 is a view in elevation of the control mechanism within the cross slide transmission, the cover plate with the control handles shown in Fig. 16 having been removed.

As shown in Figs. 15 and 16, the tool spindle 34 is carried in a rotatable supporting head 325 by means of a radially adjustable transverse slide 326 which supports the axially adjustable quill 283 within which the spindle 34 is rotatably mounted. The rotatable head 325 is carried in the forward end of the rotary head casing or frame 97 by means of preloaded ball bearings 327. The head may be rotated manually or under power drive in a manner to be hereinafter more fully explained. Thus, the head will serve to move the eccentrically disposed spindle 34 through a circular or arcuate path of a radius determined by the position of the adjustable movable cross slide 326 in effecting a gyratory machining operation. The spindle range change transmission case 309 is pivotally journalled on the top of the adjustable slide 326 with appropriate oil seals to prevent any of the lubricant from escaping from the transmission case. The adjustable slide is mounted by means of a pair of preloaded ball bearing gibs 328 and 329, as shown in Figs. 15 and 18. The inner portion of each gib is slightly tapered and adjustably retained relative to the adjustable slide 326. Thus, the position of the spindle 34 relative to the diametral line of the rotary supporting head 325 may be adjusted by moving the slide 326 transversely of said line. By loosening one gib and tightening the other gib, the slide 326 may be precisely positioned to effect movement of the spindle along the diametral line. Adjustment of the movable portions of the gibs 328 and 329 is effected by manually rotating the screws 330 and 331, respectively, as shown in Figs. 16, 17 and 18. Movement of the cross slide 326 can be effected manually by the manipulation of a ball crank handle 332 disposed on the side of the rotary head 325 as shown in Fig. 16, and connected via gearing (not shown) to drive a screw shaft 333. A dial 334 bearing appropriate indicia enables the operator to precisely set the cross slide 326 in any selected transverse position in the rotary head 325. The screw 333 is disposed to effect movement of the slide by means of a split nut mechanism (not shown) fixedly mounted in the cross slide 326 and operative in a well known manner. The split nut mechanism may be operated to connect or disconnect the nut from the screw 333 through the selective manipulation and positioning of a shifter handle 334a shown in Figs. 1, 2 and 16.

As previously mentioned, the spindle 34 may be power driven in a high or low speed range as determined by the selective positioning of gearing in the range change transmission 310 shown in Fig. 15. With a bull gear 335 meshing with the gear 317 keyed to the pulley 316, the spindle 34 is driven in a low speed range. The bull gear 335 is splined for axial movement on a shaft 336 journalled in the range change transmission case 309. When the gear 335 is meshed with the gear 317, a smaller gear 337 integrally formed with the bull gear is simultaneously meshed with a gear 338 fixedly keyed to the driving sleeve 320 splined to drive the spindle 34. Thus, with the bull gear 335 and the gear 337 positioned as shown in Fig. 15, a low speed drive from the pulley 316 to the spindle 34 is completed whereat the spindle may be driven at any one of the sixteen speed rates as determined by the setting of the spindle speed transmission 282, as previously described.

When the spindle 34 is to be driven in a high speed range, a second drive train is utilized. At this time, the gear cluster constituting gears 335 and 337 must be axially raised from the position shown in Fig. 15 until the gears are out of mesh with the gears 317 and 338. Thereafter, an internal gear 339 slidably splined on the driving sleeve 320 is raised until the teeth thereof mesh with the teeth on the gear 317. Thus, a high speed drive is provided from the pulley 316 and the gear 317 via the internal gear 339 and the driving sleeve 320 to the spindle 334. Since the spindle speed transmission 282 is selectively controllable to drive the pulley 316 at any one of sixteen speed rates, the tool retaining spindle 34 may likewise be driven selectively at one of sixteen speed rates in the high speed range. When both of the gears 335 and 339 are disposed in a disengaged position, the spindle 34 may be freely rotated. However, when the gears 335 and 339 are partially meshed with the gear 317 through selective axial positioning of the gears, the spindle 34 is locked in position and cannot be rotated.

As shown in Figs. 4 and 15, a draw bolt 340 extending axially through the hollow spindle 34, is adapted to retain a cutter in the tapered tool receiving end 341 of the spindle in a well known manner during cutting operations. A second quick change adapter means for locking a tool in the tapered end or spindle nose 341 of the spindle 34 is provided. This means consists of a retaining locking ring or collar 342, as shown in Figs. 15 and 18, which is threadedly retained on the lower end of the spindle and which contains an internally formed recess 343 adapted to fit around the flange of any standard type of cutter arbor (not shown) in a well known manner.

The introduction of the spindle speed transmission 282 and the range change transmission 310 serve to vastly improve the operation of a rotary head milling machine, such as was previously covered by the aforementioned Patnt No. 2,379,405. Not only were the number of speed rates at which the tool spindle 34 could be operated greatly increased to provide a much wider adaptability of the machine to intricate milling and grinding operations, but the rates of spindle speed were more accurate upon the introduction of the direct drive, such as herein disclosed. In addition, the elimination of the belts, such as disclosed in the aforementioned patent, serve to eliminate the need for moving belts from one pulley to another and permit a faster and more accurate means of controlling the speed of the tool spindle 34; since the speed at which the spindle was operating was clearly indicated on the control mechanism, no error is possible.

Both transmissions governing the speed rate of the spindle 34 are selectively controlled from control mechanisms operably contained in the rotary head casing 97. As previously explained, the spindle speed transmission 282 is operably controlled through the selectively manipulation of the crank 291 constituting a portion of the speed box 284 operably mounted in the side of the casing 97, as shown in Fig. 2. The spindle range change transmission 310 containing the range change gearing is controlled from a control handle 347 operably mounted on the side of the rotary head casing 97, as shown in Figs. 2, 4 and 16. Through the manipulation of this handle, the spindle may be power driven in either a high speed range or a low speed range, released for free rotation or securely locked against all rotation.

As shown in Figs. 4 and 16, the control handle 347 is disposed for selective rotation and positioning on the outer end of a stub shaft 348. A resiliently retained plunger (not shown) within the control handle 347, normally extends therefrom into one of four retaining holes in the casing 97. With the handle in the position shown in Fig. 16, the control mechanism is disposed to position the range change gearing in the transmission 310 for operation in the slow speed range. Whereas, when the handle is positioned to lock the plunger in the hole 349, the range change transmission 310 is disposed to operate in the high speed range. The stub shaft 348 has a gear 350 fixedly retained thereon which meshes with another gear 351 rotatably supported within the head and connected to drive a universal jointed drive shaft 352, the opposite end of which is connected to a shaft 353 rotatably mounted in the transmission case 309. The drive shaft 352 is of the extensible type whereby it will remain connected to the shaft 353 to provide control of the transmission 310 regardless of the position assumed by the transmission case 309 during the rotation of the rotary head 325.

The rotation of the drive shaft 352 and shaft 353 through the selective manipulation of the crank 347, serves to position the gears in the range change transmission 310 and provide one of four conditions in the operation of the tool retaining spindle 34. As shown in Fig. 16, the shaft 353 is provided with a drum cam groove 354 on its peripheral surface which is engaged by the inner end of a follower stud 355 threadedly retained and locked in a sleeve 356 slidably mounted for axial movement on the shaft 353. A gear rack 357 integrally formed on the bottom side of the sleeve 356, is designed to mesh with a spur gear 358 rotatably mounted in the transmission case 309. The gear 358 is connected with a gear 359 shown in Fig. 15, which, in turn, drives a rack integrally formed on a shifter fork 360. The shifter fork 360 is disposed to engage and effect selective positioning of a gear cluster constituted of the aforementioned gears 335 and 337. With the control handle 347 positioned as shown in Fig. 16, the gears 335 and 337 are axially positioned to complete the slow speed drive train to the spindle 34. If the control handle 347 is rotated in a counterclockwise direction to engage the plunger in the hole 349, the cam groove 354 will be rotated to operate the shifter fork gearing and cause the gear cluster to be raised so that the gears 335 and 337 are out of mesh with their respective mating gears 316 and 338, respectively. This serves to break the slow speed driving train.

Two additional cam operated sleeves 361 and 362 are operably disposed for selective axial movement on the shaft 353, as shown in Fig. 16. The gear racks integrally formed on each of the sleeves 361 and 362 mesh with gears 363 and 364, respectively. As shown in Fig. 15, the gear 363 is integrally formed with the gear 365 while the gear 364 is integrally formed to drive the gear 366. Both of the gears 365 and 366 are diametrically disposed to mesh with a circular rack 367 integrally formed on a circular shifter yoke 368 which is designed to carry the internal gear 339. The internal gear 339 constitutes the drive for the high speed range. Two gears 365 and 366 are used to operate the shifter yoke 368 in order to avoid the possibility of canting of the gear 339 on the driving sleeve 319.

Two intermediate positions, as indicated by the holes 369 and 370 for retaining the plunger within the control handle 347, serve to position the control mechanism and effectively position the range change gearing in a manner to free the spindle 34 from the drive train entirely or to lock the spindle 34 against all rotation. With the control handle plunger retained in the hole 369, the sleeves 357, 361 and 362 will have been cam operated to effectively position the range change gears in a manner where both the high speed and low speed drives are partially in mesh. Thus, the spindle 34 will be locked in position against all rotation. When the control handle is positioned for retention in the hole 370, the cam actuated sleeves are effectively operated to shift the range change gearing in the high speed and low speed drives out of engagement and permit the spindle 34 to be freely rotated within the quill 283. A micro-switch 371, as shown in Fig. 4, operatively actuated by means of a cam plate 372 keyed on shaft 348 upon any manipulation of the range change control handle 347, serves to electrically disconnect the drive motor 275 whenever the machine operator makes a change in the range change setting. The same switch 371 is designed to provide electrical "inching" of the motor 275 as an aid to jogging the gearing whenever the handle 347 is moved. This is a safety feature which prevents any possibility of attempting to effectively shift the gears to one of the aforementioned combined positions while they are being power driven.

Any change in the range change setting of the machine disclosed and described in the aforementioned Patent No. 2,379,405, had to be made by positioning various belts and manipulating various hand wheels carried on the rotary head structure. In this machine, the control handle 347 is operatively mounted on the stationary rotary head casing 97. The selective manipulation of the handle 347 serves to operate the gear shifting mechanism within the range change transmission 310 regardless of the position of the transmission due to the oscillatory motion on the rotary head 325. The improved structure permits a rapid change in the setting of the range change gearing contained in the spindle range change transmission 310, with the speed setting readily determinable by observing the position of the control handle 347 in conjunction with the position of the crank handle 291 on the dial 292.

An important consideration in the design of the rotary head mechanism and the introduction of range change gearing into the range change transmission 310, was the need for pressure lubrication to various rotating gears and bearings contained therein. A complete pressure lubrication system was provided for the range change transmission. The lubricant is pumped from the reservoir contained in the bottom of the rotary head casing 97 by a pump 296 driven from the drive motor 275, as previously explained. As shown in Fig. 15, this pump is power driven whenever the drive motor for operating the rotary head spindle mechanism is electrically energized. As shown in Figs. 4 and 15, the lubricant from the pump is conducted via a line 375 to a pilot connector post 376 pivotally mounted in the top cover of the pilot carrier 304 containing the upright drive shaft 303 connectibly driven from the spindle transmission 282. An internal passageway (not shown) from the post 376, connects with a line 377 attached to the side of the pilot carrier 304, as shown in Fig. 4. The line or pipe 377 extends into a lubricant passageway 378 machined in the transmission case 309. The passageway 378 is of sufficient length to permit the tube 377 to slide therein and conduct lubricant thereto regardless of the position of the spindle range change transmission case 309 due to the rotation of the rotary head mechanism.

Drilled passageways (not shown) in the transmission case 309 connect with the passageway 378 and conduct lubricant to each of the bearings within the transmission case. Lubricant is also conveyed to the bearings in various rotating parts within the pulley bracket 308. Excess lubricant draining into the bottom of the bracket 308 is returned to the enclosed portion of the transmission case 309 via a drain tube 379 fixedly attached to the bracket 308, as shown in Fig. 15. A second passageway 380 in the bottom of the transmission case 309 conducts the excess lubricant from the spindle range change transmission 310 to a tube 381 slidably mounted therein and fixedly attached to the pilot carrier 304. As the transmission assembly is oscillated on the rotary head 325, the tube 381 will slide in the passageway 380 while an oil seal 382 will prevent leakage from the passageway into the upper portion of the rotary head casing 97. Another oil seal 383 serves to prevent leakage of the lubricant in and about the driving sleeve 320 splined to drive the spindle 34. After the lubricant is returned to the pilot carrier casing 304, it is free to drain downwardly alongside the shaft 303 into the cavity containing the spindle speed transmission 282.

In machining intricate dies and the like, it is necessary to coordinate the rotary movement of the head with the power rotation of the tool retaining spindle 34. An improved feed transmission and drive means 385 is provided to effectively drive the rotary head 325. In order to synchronize the rotation of the head with the spindle drive, the power source for the feed transmission 385 is derived from the secondary shaft 281 in the spindle transmission 282. A gear 386 keyed to the end of the secondary shaft 281, meshes with a gear 387 keyed to the end of a reverser shaft 388 in the feed transmission 385. The shaft 388 is directly connected to drive one element in each of a pair of opposed overrunning clutches 389 and 389A. The other element of each of the overrunning clutches 389 and 389A are connected directly with a pair of bevel gears 390 and 390A. Both of the gears 390 and 390A are disposed to mesh with a bevel gear 391 integrally formed with a second gear 391A which, in turn, is disposed to mesh with a gear train 392 constituting a portion of the feed transmission 385 and contained in a feed transmission case 393 unitarily mounted in the side of the rotary head casing 97, as shown in Fig. 2.

The purpose of the opposed overrunning clutch mechanisms 389 and 389A is to provide means for automatically effecting uni-directional rotation of gears 391 and 391A irrespective of changes in the rotational direction of shaft 388. The direction of rotation of the tool-retaining spindle 34 is accomplished by electrically reversing the motor 275. While such reversal will simultaneously effect a reversal of the shaft 388, one or the other of the clutches 389 and 389A will drive the bevel gear 391 while the other will overrun in a well known manner. Thus no change in the rotational direction of the rotary head feed transmission 385 will occur. Reversal of the rotary head feed drive to the rotary head 325 is accomplished independently by means of a reverser mechanism to be hereinafter more fully described. Electrical control of the rotary head motor 275 and of the bed transmission motor 39 is readily effected from either a switch panel 398 mounted in the front of the bed 25 or from a control pendent switch 399, as shown in Figs. 1 and 2.

A plurality of gear clusters selectively operable in the gear train 392 serve to drive a safety clutch and output shaft 394 at one of sixteen feed rates. A feed change mechanism operably contained in the transmission case 393 and controlled from a feed rate control handle 395, conveniently disposed at the side of the machine as shown in Figs. 1 and 2, permits the operator to readily select a feed rate at which the rotary head 325 is to be operated. A dial 396 associated with the handle 395 affords direct reading of selected feed rates, which are given in R. P. M. and are in approximate geometrical progression from ¼" to 40". A chart 397 for converting these readings into linear feed at any radius accompanies dial 396.

The rotary head 325 may be selectively rotated through the manipulation of a handwheel 401 conveniently disposed on the front of the rotary head casing 97, as shown in Figs. 1 and 2, or it may be power driven from the feed transmission 385. As shown in Fig. 4, the handwheel 401 is rotatably mounted on the forwardly extending end of a rotary head drive shaft 402. A trigger mechanism 403 operably mounted on the hub of the handwheel 401, serves to disengage the handwheel from an operable connection with the shaft 402 whenever the latter is being power driven. A dial 404 adjustably mounted on the end of the shaft directly behind the handwheel, permits one to readily ascertain the amount of movement effected through the manual manipulation or the power operation of the rotary head. An adjustable dual lead worm 405 keyed to and driven from the drive shaft 402 meshes with a worm wheel 406 integrally formed on the outer periphery of the rotary head 325. The power connection from the feed transmission 385 to the rotary head drive shaft 402 is completed by the horizontally disposed power output shaft 394 shown in Figs. 4 and 15. A gear 407 on the outer end of the shaft meshes with and drives a pair of rotatably mounted reverser gears 408 and 409. A clutch member 410 intermediately disposed between the two gears and splined for selective axial positioning on the drive shaft 402, serves to provide a power drive through either of the gears 408 or 409 to the drive shaft. Thus, when the clutch element 410 is clutched to the gear 408, the output shaft 394 and the gear 407 will drive the shaft 402 through the gear 408 in one direction of rotation. Whereas, when the clutch element is moved to engage the gear 409, the power transmitted through the output shaft 394 will serve to drive the shaft 402 in the opposite direction of rotation.

The clutch element 410 is selectively positioned in one of three positions through the manipulation of a handle 411 operably mounted on the side of the head, as shown in Figs. 1 and 2. The handle 411 is fixedly mounted on the extending end of a stud shaft 412, as shown in Fig. 4. The shaft, in turn, is connected with linkage and detent mechanism 413, contained within the rotary head casing 97, which serves to retain the handle and a shifter rod 414 connected therewith in one of three positions. A shifter fork 415 keyed to the rear end of the rod 414 operably engages the cluutch 410 at all times. With the handle 411 in the vertical position shown in Fig. 2, the shifter rod and fork are positioned to retain the clutch 410 in a neutral intermediate position between the two gears. At this time, neither of the gears is engaged to provide a power drive to the rotary head drive shaft 402, and, consequently, the rotary head 325. When the handle 411 is manipulated forwardly from the neutral position shown in Fig. 2, the shifter mechanism operates to provide a power drive from the gears 407 and 408 through the clutch 410 to the shaft 402, and, consequently, effect right hand rotation of the rotary head 325 When the lever 411 is moved rearwardly from the neutral position shown in Fig. 2, the shifter mechanism is operated to bring the clutch 410 into engagement with the gear 409 whereby the drive shaft 402 is driven in the opposite direction to effect left hand rotation of the rotary head assembly 325.

The selective positioning of stop dogs 416 in a T-slot 417 formed in the exposed periphery of the rotary head 325, as shown in Fig. 2, serves to operate a shifter mechanism and shift the clutch 410 to the aforementioned neutral or intermediate position and thereby interrupt the power drive to the rotary head 325. The dogs are designed to engage a tripping element 418 in a well known manner and to actuate the shifter rod 414 to a neutral position. Thus, the machine operator may readily control the manual or power rotation of the rotary head assembly 325 from a single convenient position in the front of the machine whereat he is readily able to observe the machining operation upon the workpiece.

As diagrammatically shown in Fig. 12, two power drives are provided within the rotary spindle head 325 for effecting power movement of the spindle retaining quill 283 or for driving a cherrying device 422. Generally, the power is transmitted via a spindle drive contained in the cross slide transmission case 423. The spindle drive originates from a gear 424 slidably mounted on the upward extending splined portion of the tool retaining spindle 34. The gear 424 meshes with and drives the gear 425 fixedly retained on the top end of a shaft 426. As shown in Fig. 18, the shaft 426 is rotatably journalled in the rotary head 325 and extends downwardly into the adjustable cross slide 326. A worm 427 keyed to the lower end of the shaft 426 meshes with a worm wheel 428, as shown in Fig. 12. The worm wheel is keyed to a shaft 429 rotatably journalled within the cross slide 326, as shown in Figs. 12 and 18. Also keyed to the shaft 429 is a four step gear assembly 430. Each of the four gears constantly meshes with individual gears rotatably mounted on a shaft 431 and constitutes part of an intermeshing gear cone transmission 432. Any one of four gears may be selectively keyed to drive the shaft 431 and a gear 433 keyed to the end thereof through the action of a ducking key (not shown) contained within the shaft 431 and operably movable through the selective positioning of a control handle and rod assembly 434 in a well known manner. Thus, the shaft 431 and the gear 433 may be power driven at any one of four selected speed rates depending upon the selective positioning of the handle 434 operably disposed on the side of the cross slide transmission case 423.

A second power drive, commonly referred to as the rotary head drive, is provided for driving the quill 283 or the cherrying device 422. The source of power for this drive originates from an internal ring gear 438, as shown in Fig. 12, attached to the top side of the rotary head 325. Rotation of the rotary head serves to drive a pinion gear 439 meshing with the ring gear 438. As shown in Figs. 12 and 19, the pinion gear 439 is rotatably mounted within the rotary head 325 and is disposed to drive a bevel gear 440 likewise mounted in the rotary head member. The gear 440 meshes with and drives a bevel gear 441 slidably mounted on a splined shaft 442. The gear 441 is rotatably journalled in an extension bracket bolted to the rotary head 325. A second bevel gear 443 splined to the shaft 442 for slidable movement thereon, meshes with and drives a bevel gear 444, as shown in Figs. 12 and 18. Both of the bevel gears 443 and 444 are rotatably retained in a gear case 445. The gear 444 is connected by a short shaft to a gear 446 which, in turn, meshes with and drives a gear 447 mounted on the upper end of a shaft 448. The shaft 448 is rotatably journalled in the cross slide transmission case 423. A pair of bevel gears 449 serves to transmit the power from the shaft 448 to the shaft 450 contained within the transmission case 423, as schematicaly shown in Fig. 12. The shaft 450 serves to drive a gear 451 mounted on the end thereof and which meshes with the gear 452 keyed to a shaft 453. The shaft 453 constitutes the input shaft to a pick-off gear transmission 454 contained in the transmission case 423 and is readily accessible through a hinged cover 455, as shown in Figs. 12 and 18. By changing a combination of the gears on the input shaft 453, an intermediate shaft 456 and an output shaft 457 in a well known manner, the speed rate of the output shaft 457 may be readily changed. A gear 458, keyed to the inner end of the output shaft 457, meshes with a gear 459 operably disposed on a shaft 460. The shaft 460 is disposed to drive a gear 461 keyed to the end thereof.

Power for driving the quill 283 axially or for driving the cherrying device 422, may be utilized from either the spindle drive train to the gear 433 or the rotary head drive train to the gear 461. A selector gear 464 operably mounted on a shaft 465, may be selectively positioned to mesh with either the gear 433 or the gear 461, as shown in Figs. 12 and 18. Selective positioning of the selector gear 464 is effected through the manipulation of a control handle 466, as seen in Fig. 16. With the handle 466 in the position shown, the gear 464 will have been shifted leftwardly to mesh with the gear 433 whereby the spindle drive is utilized to drive the quill or cherrying means. When the handle 466 is shifted to the right hand position whereat it would be retained in the notch hole 467, the gear 464 will mesh with the gear 461 to utilize the rotary head drive for driving the quill or cherrying device. As shown in Fig. 17, a crank pin 468 operably disposed on the inner end of the control handle shaft is operably retained in a vertical slot in a shifter fork 469 slidably retained on a bar 470 rigidly mounted in the cross slide transmission case 423. The semicircular movement of the control lever to one of the two aforementioned positions serves to effect horizontal movement of the shifter fork 469 on the bar 470. Since the fork 469 is operably mounted in a clutch slot in the selector gear 464 at all times, the gear will be shifted correspondingly to mesh with either of the gears 433 or 461.

As shown in Figs. 12 and 18, a gear cluster including a gear 473 and a gear 474 is rotatably journalled on the shaft 460. A gear 475 having an extending splined hub on which the selector gear 464 is splined for selective axial positioning, meshes with the gear 473, while a gear 476 splined on the shaft 465 meshes with the gear 474. When the gears 475 and 476 are thus meshed with back gears 473 and 474, a low speed drive is provided to the shaft 465. When the gear 476 is shifted leftwardly from the neutral position shown in Fig. 18, clutch teeth 477 on the hubs of the gears 475 and 476 lock together to provide a direct drive in the high speed range. Shifting of the range gear 476 is effected through the manipulation of a control handle 478 shown in Fig. 16, operably mounted on the side of the cross slide transmission case 423. When the handle 478 is positioned as shown in Fig. 16, the crank pin 479 on which it is mounted, as shown in Figs. 16 and 17, will effect movement of a shifter fork 480 engaging the gear 476 to position the gear for operation in the aforedescribed low speed range. However, when the handle 478 is manipulated to a position wherein it will engage a notch hole 481, the rotation of the crank pin will serve to move the shifter fork 480 and the gear 476 leftwardly until the clutch teeth 477 engage to provide operation in the high speed range.

The range change gearing, as described, is used to drive a reverser mechanism 484 shown in Figs. 12 and 18. The gear 476 is designed to drive the intermedially disposed clutch member 485 at all times when the transmission is power driven. A pair of bevel gears 486 and 487 are rotatably mounted on each side of the clutch member 485 and mesh with a driven bevel gear 488 mounted on a shaft 489, as shown in Figs. 12, 18 and 19. A safety clutch 490 connected to the shaft 489 operates to drive a shaft 491 and a worm 492. The worm 492 meshes with and drives a worm wheel 493 keyed to a shaft 494 rotatably journalled within the cross slide transmission case 423.

The reverser mechanism 484 serves to permit a reversal in the direction of rotation of the power drives previously described. The reverser clutch 485 is selectively operable through the manipulation of a reverse lever 495. When the lever 495 is rotated leftwardly from the neutral position shown in Fig. 16, a reverser control mechanism 496 operatively connected thereto, serves to actuate a shifter 497 and the clutch element 485 connected thereto whereby the movement of the quill 282 will be upwardly. On the other hand, when the reverser lever 495 is shifted rightwardly from the neutral position shown in Fig. 16, the reverser clutch 485 will be moved to provide a clutching engagement between it and one of the gears to effect downwardly movement of the quill.

The reverser control mechanism 496 is more clearly shown in Fig. 19. The reverse lever 495 is operatively retained on the outer hub end of a gear 498. The gear 498, in turn, meshes with a second gear 499 rotatably mounted within the cross slide transmission case 423. The shifter fork 497 is mounted for sliding movement on a retaining shaft 501. A contact plate 502, as shown in Figs. 17 and 19, is keyed to the retaining shaft 501 in abutting relationship with the shifter fork 497 in a manner that will effect sidewise movement of the shifter fork 497 whenever force is imparted to the remaining contact plate 502. Each of the gears 498 and 499 is provided with contact pins 503 and 504, respectively, anchored in their side walls in a manner to engage the opposed slots 505 in the contact plate 502, as best shown in Fig. 17. Only one of the pins will engage a slot in the contact plate 502 at any one time and the aforedescribed rotative manipulation of the reverser lever 495 will serve to effect sidewise movement of the contact plate depending upon the engagement of the plate with a given pin.

The contact plate 502 may be selectively tilted through the manipulation of a correlator crank 508 operatively disposed on the side of the transmission case 423, as shown in Fig. 16. The crank 508 is connected via gearing 509 to effect rotation of the retaining shaft 501 upon which the contact plate 502 is fixedly retained. Depending upon the use of either the spindle drive or the rotary head drive as aforedescribed, it is necessary to manipulate the correlator crank 508 to one of two positions. The manipulation of this crank is necessary in order to correlate the movements of the reverser lever 495 with the rotative direction of the transmission drive selected, in order to provide for a unified drive to the quill 283 or to the cherrying device 422 according to indicia associated with the reverser lever 495. This arrangement also serves to correlate the drive with the automatic tripping means automatically actuated by the movement of the quill 283 and the cherrying means 422. Thus, direct manual control of the reverser mechanism 484 is provided whereby it is possible to readily reverse the drive to the quill or the cherrying means, and to correlate the direction of the rotary drives with the quill or cherrying movement.

As diagrammatically shown in Fig. 12, a selector gear 510 is slidably keyed on the shaft 494 for selective positioning with a gear 511 mounted on a shaft 512 constituting a quill drive or with a gear 513 mounted on a shaft 514 constituting a cherrying drive. The gear 510 may be selectively positioned to provide a drive to either the quill 283 or to the cherrying means 422 through the manipulation of a selector lever 515, as shown in Fig. 19, to one of two positions. The selective movement of the lever operates to effect corresponding movement of a shifter fork (not shown) which is clutched to the gear 510 in a well known manner. The gear 510 must be shifted to either one of the two positions to provide a power drive to the quill or to the cherrying means. The shaft 512 is driven from the gear 511 and has keyed thereon a pinion gear 516 which meshes with a gear rack 517 integrally formed in the vertical side wall of the quill 283. Thus, rotation of the gear 511 on the shaft 512 will cause upward or downward movement of the quill rotatably supporting the tool retaining spindle 34.

Manual operation of the quill 283 or of the cherrying means 422 may also be effected. In order to provide for manual operation, the reverse lever 495 must be manipulated to a neutral position whereat the clutch member 485 in the reverser mechanism 484 is centrally positioned and out of clutching engagement with either of the reverser gears 486 and 487. At this time, the shaft 491 may be freely rotated through the manipulation of a handle 518 keyed to the outer end thereof as constructively shown in Fig. 19. A dial 519 bearing appropriate indicia (not shown) permits the machine operator to make fine adjustments in positioning the quill 283 or in operating the cherrying device 422. It should be apparent that the selector gear 510 must be positioned to provide a drive to the quill 283 or to the cherrying means while such manual adjustments thereof are effective through the manipulation of the handle 518.

Thus, for example, if the rotary head mechanism was to be adapted for a drilling or boring operation upon a workpiece mounted on the table 27, the following placement of various levers on the rotary head would be necessary to provide an appropriate drive for the tool retaining spindle 34. The control lever 466 must be positioned to provide a power drive from the spindle as aforedescribed while the selector lever 515 on the rear of the rotary head, as shown in Fig. 19, must be positioned to shift the gear 510 and provide a drive to effect power movement of the quill 283. The correlator crank handle 508 would have to be manipulated to a position whereat indicia associated therewith would indicate that the drive corresponded to the direction of rotation of the spindle. The rate of quill feed is predeterminately selected by positioning the cone transmission control rod 432 and the range change control handle 478 to designated positions as indicated on a feed rate chart attached to the machine. Thus, the rate at which the quill 283 is to be advanced or retracted during the drilling or boring operation may be readily ascertained and set. The feed rates designated on the chart are stated in inches per revolution of the spindle 34. The rotary head mechanism would then be set to perform a drilling or boring operation with a power drive being provided to effect movement of the quill 283 at a predetermined rate in relation to the rotation of the tool retaining spindle 34. An automatic limit control means to be hereinafter more fully described, may be adjusted to control the limits of quill movement for a given drilling or boring operation. The limits of quill movement may be selectively controlled in either direction by the automatic limit means.

Automatic or manual control is provided for the operation of the various drives within the rotary head. For example, feeding movement of the quill 283 may be controlled manually through the manipulation of the reverse lever 495, as shown in Fig. 19 and previously described, to effect power movement of the quill and thereafter manually rotating the crank handle 518 to precisely position the quill at a selected axial position, as indicated on the dial 519. At this time, the reverse lever 495 is positioned, as shown in Fig. 19. The bottom end of the pivotally mounted lever 495 is operably retained in a diametrical slot in the shifter rod 522 disposed for axial movement in the gear 498. The rod 522 extends through the center of the gear and is supported for axial movement at its inner end in a sleeve bearing 523. One arm of a bell crank 524 is pinned to connect with a diametrical slot on the side of the shifter rod 522 while the other arm of the bell crank 524 is provided with a gear segment 525 which meshes with a gear 526 keyed to the end of a hollow shaft 527. When the lever 495 is positioned for manual control, as shown in Fig. 19, the hollow shaft 527 will be rotatively and axially positioned, as shown in Fig. 17. In this position, a resiliently operated detent mechanism 528 will retain the shaft 527 in the neutral center position through engagement with a segmentary detent groove formed in the periphery of the shaft. This serves to retain the shaft against axial movement. At the same time, a crank pin 530 fixedly mounted in the side wall of the gear 498 operatively rotated through the sidewise movement of the control handle 495, as shown in Fig. 19, is retained in a cam grove 531 machined in an extension shaft 532. The extension shaft 532 is retained in the right end of the hollow shaft 527 and is pinned thereto for unitary rotary and axial movement therewith. The diameter of the crank pin 530 and the width of the cam groove 531 is practically identical when the shafts 527 and 532 are rotatively positioned, as shown in Fig. 17. Thus, if the lever 495 is moved rightwardly or leftwardly from the neutral position shown in Fig. 16, the partial rotation of the gear 498 and the crank pin 530 will effect a positive movement of the shafts 527 and 532 in the opposite direction with the detent mechanism 528 serving to retain the shafts in such an axial position. As aforedescribed, the movement of the reverser lever 495 will effectively control the reverser mechanism 484 to provide a power drive to the quill in either direction.

Another crank pin fixedly mounted in a crank arm 533 keyed to the end of a control shaft 534, is retained in the cam groove 531 of the extension shaft 532. The crank pin on the arm 533 is always disposed in the narrow portion of the cam groove 531 so that any axial movement of the shaft 532 is immediately transmitted to the crank arm 533 and the control shaft 534. Rotation of the control shaft 534 journalled in the cross slide transmission case 423, as shown in Fig. 19, serves to operate another crank arm 535 keyed to the other end of the shaft. A pin 536 mounted in the end of the arm 535, as shown in Figs. 19 and 20, is disposed to fit in a transverse slot in a shifter rod 537 disposed for endwise movement. As shown in Fig. 20, the crank arm 535 and the rod 537 are disposed in a neutral position with movement of the reverser lever 498 serving to accomplish endwise movement of the rod in either direction from the neutral position. A crank arm 538 pivotally mounted on a stub shaft 539 has a crank pin fixedly retained in the end thereof to engage a transverse slot in the shifter rod 537. Movement of the rod effects partial rotation of the stub shaft 539 and of a trip arm 540 fixedly attached to the end thereof. The arm 540 is mounted on the outside of the cross slide transmission case 423.

The trip arm 540 is actuated upon engagement with one of two trip dogs 543 and 544 predeterminately positioned and bolted to a vertical slide member 545 slidably disposed in a vertical way 546 formed in the side of the transmission case 423. The trip dog 544 serves to control the limit of downward travel of the quill 283 while the trip dog 543 serves to control the limits of upward travel of the quill. Each of the dogs are predeterminately positioned when the machine is set up and, thereafter, serve to stop or reverse the direction of quill travel at a predetermined point.

The slide member 545 carrying the two trip dogs is disposed in the way 546 for unified movement with the quill 283. As shown in Figs. 20 and 21, a gear tooth rack plate 547 is bolted to the back side of the slide member 545 and the teeth thereon mesh with a pinion 548. As shown in Fig. 21, the pinion 548 is provided with an extended hub rotatably journalled and supported in the transmission case 423. A gear 549 is keyed on the hub of the gear 548 and meshes with the pinion gear 516 disposed to mesh with the gear rack 517 as previously explained, to drive the quill 283. The ratio of the gearing operating the slide member 545 is one to one so that the movement of the slide member is identical to that of the quill 283. With this arrangement, it is possible to provide an automatically controlled power drive for the quill 283 in a manner wherein the quill may be lowered or raised under power feed to a predetermined point and stopped or reversed depending upon the preselected setting of the trip dogs, as aforedescribed. Any further power movement of the quill 283 would necessitate the manipulation of the reverse lever 495 to one of the two driving positions. Where a precise setting of the quill 283 is necessary for a particular machining operation, the quill could then be manually positioned through the manipulation of the crank handle 518. Or, the quill 283 may be power fed to a predetermined point as determined by a selected positioning of one of the trip dogs 543 and 544, and, thereafter, effect a reversal in the quill feed in the opposite direction through the automatic operation of the control mechanism hereinafter more fully described.

Control mechanism is provided to effect an automatic reversal of the quill feed without any manipulation of the control lever 495. In order to provide for automatic reversal, the control lever 495 must be pivotally shifted to the dotted position 553 indicated in Fig. 19. The lever 495 is pivotally mounted on a pin 554 fixedly retained in the yoke keyed to the outer end of the gear 498. Movement of the lever 495 in the plane indicated in Fig. 19, effects an axial movement of the shifter rod 522 to operate the bell crank 524. A detent mechanism 555 operative on one arm of the bell crank 524, serves to retain the control lever 495, the shifter rod 522 and the bell crank 524 in either of the two selective positions. Since a gear segment 525 on one arm of the bell crank 524 is constantly in mesh with the gear 526 fixedly retained on the right end of the hollow shaft 527 as shown in Fig. 17, the movement of the control lever 495 will effect rotation of the shaft 527 and the extension shaft 532. This rotation will be sufficient to change the operative relationship of the detent mechanism 528 and the detent groove 529 as aforedescribed, to a position whereat the detent is made to operate on a two position detent cam area 556. Thus, the resilient action of the detent 528 will serve to force the plunger into either of two detent grooves in the cam 556 in which the intermediate or neutral cam groove available in the detent groove 529 has been eliminated.

Rotation of the shafts 527 and 532 unitarily in the direction indicated by the arrow 557 shown in Fig. 17 upon the manipulation of the control lever 495 to the dotted position 553 will also serve to rotate the cam 531 in a manner to place the wider portion of the cam groove in a position to permit the crank pin 530 on the gear 498 to operate therein. With the control lever 495 in the automatic reverse position, any sidewise manipulation of the handle to the "up" or "down" position as shown in Fig. 16 and aforedescribed, will serve to effect endwise movement of the control shafts 527 and 532 in a direction opposite to the direction of lever manipulation. Thus, the detent 528 will be rendered operative to engage the two position detent cam 556 and retain the shafts 527 and 532 in one or the other of two positions to effectively operate the aforedescribed linkage mechanism and provide a power drive of the quill 283 in the selected direction.

When this occurs, a lost motion action is set up in the shafts 527 and 532 in a manner that any axial movement thereof resulting from the manipulation of the control lever 495 or from movement of the trip arm 540 will cause the detent 528 to be forcibly compressed until the high intermediate ridge of the detent cam 556 has been passed. Thereafter, the resilient action of the detent 528 will serve to force continued axial movement of the shafts with sufficient effectiveness to effect a reversal in the quill reverser mechanism 484 and, consequently, effect a reversal in the power drive to the quill. Thus, the direction of quill movement will be automatically reversed and movement will continue until the trip arm 540 is again actuated by one of the trip dogs 543 and 544 or until the power drive connection to the quill is interrupted through the manipulation of one of the control levers. When the cam 531 is positioned for automatic reversal, it is apparent that due to the added width of the cam groove, the control lever 495 can be moved a considerable distance before the crank pin 530 is brought into engagement with the cam 531 to effect axial movement of the shafts 527 and 532. It should be noted that the formation of the cam groove 531 is such that the crank pin on the crank arm 533 disposed on the back side of the extension shaft 532, as viewed in Fig. 17, always remains in the narrow portion of the groove. Thus, there is no lost motion between these two members when the extension shaft 532 is moved axially in either direction.

For example, if we assume that the quill 283 is being fed downwardly through a power connection effected by the manipulation of the control lever 495 in a manner to require automatic reversal, as aforedescribed, the downward movement of the quill 283 will continue until the trip dog 544, as shown in Fig. 20, is brought into engagement with the trip arm 540. Continued downward movement of the trip dog 544 will serve to actuate the arm downwardly and effect movement of the crank arm 538 and the shifter rod 537. This movement, in turn, will actuate the crank arm 535, the control shaft 534, and the crank arm 533 keyed to the other end thereof. Movement of the arm 533 will operate to effect rightward axial movement of the shafts 527 and 532, as viewed in Fig. 17. Such axial movement will be sufficient to cause the detent mechanism 528 to be compressed until the center ridge of the detent cam 556 has passed the center point of the detent plunger. Thereafter, the ever present resilient force adapted to actuate the detent mechanism 528 will operate to force the plunger against the inclined side of the cam and thereby effect continued rightwardly movement of the shafts 527 and 532. The axial movement of the shafts as effected by the resilient action of the detent mechanism 528 will be more forceful and rapid than the action initiating the shaft movement under automatic control.

The additional impetus imparted to the shafts serves to effect a positive movement of the clutch member 485 in the reverser mechanism 484. Movement of the extension shaft 432 serves to effect rotation of the gears 498 and 499 whereby the shifter fork 497 associated with the clutch member 485 is operatively actuated on a retaining shaft 501 to carry the clutch member 485 from clutching engagement with one of the bevel gears in the reverser mechanism 484 into engagement with the other bevel gear. The lost motion force is sufficiently built up in the shaft before the crank pin 530 on the gear 498 is engaged by the wider portion of the cam 531, that the shifting movement of the clutch member 485 is positively effected with sufficient force to carry the member beyond the intermediate neutral position. When the gear 498 is rotated, the control lever 495 is automatically moved from one extreme position to the other without stopping at the intermediate neutral position, as viewed in Fig. 16. Thus, the machine operator is made aware of the direction of quill travel even though the feeding movement is under automatic control. When the control lever 495 is set for automatic control, the power feed to the quill 283 can be reversed an indefinite number of times as determined by the preselected position of the trip dogs 543 and 544. The continued operation of the control mechanism to effectively shift the clutch member 485 in the reverser mechanism 484 from one extreme engaged position to the other, will serve to effect a continued reversal of the power feed drive adapted to feed the quill 283. The automatic operation of the control mechanism will continue until the control lever 495 is moved from the dotted position 553 shown in Fig. 19 to the full line position shown therein, whereat the shifter rod 522 is moved leftwardly to effectively rotate the control shafts 527 and 532 and the control mechanism is adapted for manual control, as aforedescribed.

With the rotary head mechanism hereinbefore disclosed and described, it is possible to provide vertical or axial rectilinear movement of a cutter retaining spindle and provide complete correlated control of such movement. A power drive is provided to effect movement of the various elements necessary to provide the rectilinear movement, namely the quill 283, the rotary head 325 and the cross slide 326 (via cherrying device only). Thus, each of the three members may be power driven at any one of a plurality of feed rates or manually actuated and precisely positioned. Control means are likewise provided to control the power operation of these elements including automatic tripping and reversing means to fully control the limits of power feed movement and the subsequent reversal thereof. By the selective positioning and setup of the three elements serving to provide movement of the spindle 34 in any one of a plurality of transverse planes, it is possible to mill circular, spherical or curvilinear configurations in workpieces of a very intricate nature, such as are required in die sinking and similar work.

The cherrying device 422 previously mentioned as selectively driven from either the spindle transmission or the rotary head transmission, is especially adapted to simultaneously coordinate the axial and transverse bodily movement of the spindle 34 whereby it is possible to effect curvilinear or rectilinear motion along a path in any predetermined angular direction. Such intricate movements of a tool retaining spindle are commonly referred to as cherrying movements and provide a means for precisely milling very intricate configurations in a workpiece. When such movements are combined with the circular motion of the rotary head 25 to provide arcuate movement in a vertical plane of the tool retaining spindle 34, an unlimited number of variations of cutter movement are readily provided.

Some of the intricate configurations which may be prescribed in a workpiece through the use of a cherrying device such as disclosed herein, include spherical cuts, conical cuts, elliptical cuts and cylindrical cuts, whereby it is necessary to effect movement of the spindle axis simultaneously in one or more of three transverse planes. Each of these movements must be precisely coordinated with the others in order to effectively drive the cutter along a prescribed path. As a means of simplifying the description of the structure of the cherrying device, that portion of the structure necessary in effecting each of the aforementioned cherrying operations will be described in conjunction with the description of the operation of the mechanism for that particular cherrying cut.

Spherical cherrying consists of coordinating the simultaneous movement of the spindle in three planes whereby a power driven tool retained in the spindle 34 will effectively perform a spherical machining operation on a workpiece. At this time, the rotary head 325 is predeterminately set to effect a circular motion of the spindle in its axial plane at a preselected feed rate. Generally, a spherical cherrying operation is begun with the cutter starting at the outer radius of the configuration and, thereafter, by coordinating the axial advancement of the quill 283 with the radial advancement of the spindle in a horizontal plane through the movement of the cross slide 326, it is possible to machine a spherical configuration. When the spindle 34 is disposed for cherrying control, the drive mechanism normally used for effecting axial and transverse adjustment of the spindle is disconnected to free the spindle for vertical and horizontal movement in either direction. The power drive to the quill 283 used for effecting axial movement of the spindle 34 is automatically disconnected when the selector gear 510 is shifted through the manipulation of the selector lever 515, as aforedescribed, to provide a power drive to the cherrying device 422. In order to allow free movement of the cross slide 326, the nut must be fully released from the cross feed screw 333. This is accomplished by manipulating the handle 334A, as aforementioned.

As shown in Figs. 18, 21 and 23, the cherrying device 422, including a cherrying drum 560 and a bracket 561, is operably mounted on the side of the transmission case 423. A gear 562 integrally formed on the periphery of the drum 560 is power driven via a gear 563 rotatably mounted on the shaft 514. The gear 563 is operably driven from the shaft 514 whenever a clutch element 564, as shown in Figs. 12 and 21, splined to the shaft 514 is selectively positioned to engage the gear 563. The cherrying drum 560 may be power driven via the aforedescribed spindle drive or the rotary head drive. Manual adjustments of the rotary drum may be accomplished by turning the ball crank handle 518 as aforedescribed. The cherrying drum assembly 560 may be readily removed from the transmission case 423 for purposes of adjustment or interchange. Otherwise, the drum 560 is rotatably journalled in the transmission case 423.

Disposed for selective radial adjustment or movement within the cherrying drum 560 as shown in Fig. 22, is an eccentric block 565 operably mounted in a sliding guide bracket 566. The eccentric block 565 is effectively moved in the guide bracket 566, mounted in the cherrying drum 560, through the operation of a block drive screw 567 rotatably journalled within the cherrying drum and threadably engaging a nut 568 fixedly mounted in the eccentric block 565. A rearwardly extending projection 569 on the eccentric block 565 is disposed to be retained in a horizontal slot 570 machined in a quill block 571 fastened to the side wall of the quill 283, as shown in Figs. 21 and 22. It is evident that any movement of the eccentric block 565 will serve to effect a corresponding movement of the quill 283 axially and thereby effect a corresponding axial movement of the tool retaining spindle 34 journalled therein.

A forwardly extending projection 572 integrally formed on the eccentric block 565, as shown in Fig. 22, is normally disposed in a bushing and guide block 573 slidably mounted on the rear side of the bracket 561. The bushing extends through a vertical slot 574 in the bracket 561. Since the bracket 561 is fixedly mounted on the rotary head 325 when the machine is set up for any cherrying operation, a reaction force is imparted via the drum mounting in the transmission case 423 to effect transverse movement of the cross slide assembly 326 including the spindle 34. Generally, the eccentric block 565 is predeterminately adjusted to start the spherical cherrying cut at the outer diameter of the sphere, and thereafter, by effectively rotating the drum the cutter will follow a spiral path until the center of the sphere has been reached and completed. In this manner, an angular advancement of the cutter is effected while the spindle is being rotated through the power operation of the rotary head 325 as aforedescribed. The angular advancement is predeterminately selected by the choice of gears used in the pick-off gear transmission 454 in the rotary drive. When spherical cherrying is effected, the increment of axial advancement of the cutter is related to the increment of transverse advancement of the cutter directly as the sine and cosine of the angle at a given point. In this manner, a precisely formed sphere or portion of a sphere may be machined.

Upon completion of the spherical cutting operation, the power movement of the cherrying drum 560 and of the rotary head 325 may be stopped through the manual manipulation of the levers aforedescribed, or automatically through the use of a stop dog 575 predeterminately positioned in a T-slot 576 on the outer periphery of the cherrying drum 560, as shown in Fig. 21. The stop dog 575 will engage a trip arm 577 at a predetermined point during the rotation of the cherrying drum 560 and serve to actuate the control shaft 527, as aforedescribed, to effect disengagement of the power drive to the cherrying drum. As shown in Fig. 17, actuation of the control shaft 527 is accomplished when the trip arm 577 imparts a rotative movement to a secondary arm 578 rotatably keyed thereto on the inside of the transmission case 423. The arm 578, in turn, engages a shifter rod 579 disposed for axial movement in a vertical plane. The shifter rod imparts movement to a bell crank 580 pivotally mounted in the transmission case and having an operative connection with the control shaft 527 by means of a contact groove 581 in the extreme left end of the shaft. Depending on whether the control mechanism is set for automatic reversal or not, as aforedescribed, the operation of the trip arm 577 upon engagement with a stop dog 575 will determine whether the power drive to the cherrying drum 560 is completely interrupted or merely reversed to effect a drive in the opposite direction.

With the machine set up for spherical cherrying, as aforedescribed, it is possible to machine a complete hemisphere or any portion or segment thereof. If a portion of a sphere was to be machined, the desired diameter would be predeterminately selected by positioning the eccentric block 565 as previously described and, thereafter, rotating the drum to start the spherical cut at any desired point. If it was necessary to machine a segment of a sphere, the same procedure as aforedescribed would be followed except that stop dogs 416 would be predeterminately set to trip out the power drive to the rotary head and thereby stop rotation of the head. For example, if it was necessary to machine a spherical segment of 45°, the two stop dogs 416 on the rotary head 325 would be precisely positioned to actuate the tripping post 418 and thereby permit the rotary head to be power driven only through the selected 45°. Since the tripping mechanism controlling the rotary head is not automatically reversible, the machine operator must of a necessity initiate a reversal of the drive through the manipulation of the control handle 411. This handle would serve to effectively operate the reverser mechanism and provide a power drive to the rotary head 325 in the reverse direction, as aforedescribed.

The cherrying device may also be adapted to perform cylindrical cherrying. The eccentric block 565 on the screw 567 within the drum 560 must be offset from center a prescribed distance corresponding to the radius of the cylinder which is to be generated minus the radius of the cutter to be employed in performing the cylindrical cherrying operation. This setting determines the radius of the circular cut. For cylindrical cherrying, the previously described spindle drive is utilized to drive the cherrying drum 560 via gears 562 and 563. When the reverser mechanism 484 is rendered operative by the selective manipulation of the handle 495, the circular cut will be generated by the action of the offset projections 572 and 573 on the quill 283 and on the fixed bracket 561, as aforedescribed, upon rotation of the cherrying drum 560. As in the case of all cherrying operations, the cross feed nut on the screw 333 has been disengaged to free the cross slide 326 for horizontal transverse movement in the rotary head 325.

The setting of the selector knob 434 in choosing a feed rate via the spindle drive, in conjunction with the range change gear setting serves to determine the angular feed rate of the cutter while performing a circular cut. A series of successive circular cuts, when linearly displaced in small steps by moving the workpiece and table 27, or by moving the rotary head assembly 30 on the saddle 31, along the axis of the cylinder being generated, will serve to effect the desired cylindrical shape. Incremental advancements of the table 27 are effected by utilizing the precision positioning means through the manipulation of the lever 58, while advancements of the head assembly are effected by manipulating the handwheel 401.

Conical cherrying operations may also be performed on the aforedescribed rotary head milling machine through the utilization of the cherrying device 422. Conical configurations of predetermined angles and sizes may be readily milled after the feed rate of the rotary head drive in relation to the angular displacement rate of the cherrying device 422 has been set up on the machine.

Initially, the eccentric block 565 must be positioned on the screw 567 to provide a desired angular advancement of the quill 283 relative to the advancement of the cross slide 326. With the power drive to the quill 283 and the cross slide 326 disconnected to provide for free vertical and horizontal movement of the spindle in either direction, the cherrying drum 560 is operatively mounted in the transmission case 423, as aforedescribed. In establishing the angle of the cone to be machined, angular indicia 585 stamped on the side of a gear 586 must be set against a zero mark on the side of the cover plate 587 attached to the side of the cherrying drum. In so doing, the angle of the eccentric block drive screw 657 is set to correspond to the angle of the cone to be machined, and the cherrying drum 560 is then locked in this position.

During a conical cherrying operation, the eccentric block 565 is power fed by the screw 567 along the prescribed angular path as determined by the position of the screw. Power is transmitted to the screw 567 via gears 586 and 588, as shown in Fig. 21. The power transmitted by the shaft 514 is directed to the gear 588 by reversing the clutch element 564 whereby the gear 563 is disconnected from the drive and the gear 588 is connectibly driven therefrom. Since the gear 588 meshes with and drives the gear 586, power to the cherrying device 422 is directed to drive the screw 567. As shown in Fig. 22, the gear 586 is concentrically positioned relative to the drum 560 and is provided with a ring gear 589 on an extending transverse flange integrally formed therewith. Pinion gears 590 and 591 are rotatably retained on each end of the drive screw shaft 567 within the angular drum 560. By clutching either of these two gears to the shaft 567, it is possible to transmit the power thereto and to control the direction of rotation of the screw shaft. When a clutch element 592 keyed on the shaft 567 adjacent the gear 590 is shifted axially into clutching engagement with the gear, power will be transmitted to effect rotation of the screw shaft 567 in one direction. If a clutch element 593 keyed to the opposite end of the shaft 567 adjacent the gear 591 is operatively clutched to the gear, rotation of the screw shaft 567 is effected in the opposite direction. Both of the clutch elements 592 and 593 are connected to a shifter rod 594 mounted for axial movement within the cherrying drum 560. A second rod 595 having rack teeth 596 machined thereon is likewise mounted for axial movement within the drum in a plane parallel to the shifter rod 594. Whenever the position of the clutch elements 592 and 593 is to be changed, a pinion gear 597 machined on the inner end of a shaft 598 as shown in Fig. 22, is brought into meshing engagement with the rack teeth 596. There after, the manual manipulation of a knob 599 pinned to the outer end of the shaft 598 will serve to impart axial movement to the shifter rods 594 and 595 and, consequently, effect axial movement of the clutch elements 592 and 593 on the drive screw 567. In this manner, it is possible to selectively transmit the power from the gears 586 and 588 to the drive shaft 567 and thereby cause the eccentric block 565 to be moved in the sliding guide bracket 566 within the cherrying drum at a predetermined feed rate.

As a means of indicating the position of the clutches 592 and 593 within the cherrying drum 560, an indicator pin 601 is transversely mounted in the shifter rod 594 shown in Fig. 22, and extends through an opening 602 as shown in Figs. 22 and 23. The position of the pin 601 within the opening serves to indicate which of the two clutch elements is presently engaged. Small arrows stamped on the cover plate 587 serve as an aid in making this determination. As shown in Fig. 23, the pin 601 is centrally positioned to indicate that neither of the two clutches 592 and 593 are engaged but rather are retained in the neutral position shown in Fig. 22. A detent mechanism 603 operatively disposed to engage the selector rod 594 serves to retain the clutch shifter mechanism in one of the three positions even though the gear 597 has been disengaged from the rack teeth 596. A spring 604 abutting against the bushing and the knob 599 serves to force the shaft 598 outwardly and effect disengagement of the gear 597 from the rack 596. A scale block 605 having a vernier scale 606 stamped thereon may be readily read against a scale alongside the slot 574 on the bracket 561 serves to provide means for accurately positioning the eccentric block 565 in setting up a cherrying operation. Whenever it is necessary to make any changes in the settings of the cherrying drum 560, as aforedescribed, after the machine is set up, it is fairly easy to remove the lower portion of the bracket 561 by releasing a clamp handle 607, as shown in Fig. 23. When this is done, the bracket may be moved outwardly by means of a V-slide 608 formed in the bottom side of a mounting bracket 609.

After the cherrying drum 560 has been adjusted and positioned as previously described, the conical cherrying operation may be performed. The rotation of the screw 567 within the cherrying drum 560 at a selected speed, will serve to drive the eccentric block 565 at a predetermined feed rate. Movement of the eccentric block, in turn, will coordinate the axial movement of the spindle 283 with the transverse movement of the cross slide 326 in a manner to effect conical cherrying. If the rotary head 325 is not being power driven when the cherrying device is power driven via the gear 586, the tool retaining spindle will be moved to operate a cutter at an angle and machine an inclined plane on a workpiece. The angle of the plane of course will depend upon the angular setting of the screw 567 within the cherrying drum 560, as aforedescribed. If on the other hand, the rotary head 325 is power driven simultaneously with the cherrying device, a conical configuration will be machined on the workpiece. A spiral cutting path originating at the outer diameter of the cone will be generated in machining the conical configuration.

The maximum width of the conical surface machined the cherrying drum 560 set up as aforedescribed, corresponds to the maximum limits of travel of the eccentric block 565 on the screw 567 positioned at a selected angle. If a conical configuration must be machined which requires a greater width, a provision has been designed into the cherrying device 422 to permit conical cherrying in sections with the limits of each, depending upon the maximum travel of the eccentric block 565 within the drum 560. The mounting bracket 609 carrying the bracket 561, is mounted in a V-slide 612 machined in the bottom face of the rotary head 325. The V-slide 612 is designed to carry the entire bracket assembly at all times, with an adjustable gib 613 serving to provide means for adjusting alignment of the bracket relative to the rotary head. When the size of the conical configuration being machined dictates that the operation must be performed in sections, the machining of the larger diameter of the cone is accomplished by offsetting the bracket 609 relative to the rotary head 325. Since the V-slide 612 supporting the bracket is absolutely parallel with the plane of movement of the cross slide 326 operably contained within the rotary head, it is possible to precisely offset the bracket 609 relative to the rotary head 325. For this purpose, a series of precisely spaced holes 614 were provided in the rotary head 325. A resiliently retained plunger 615 is mounted in the mounting bracket 609 and is designed to engage one of the holes 614 in the rotary head. A knob 616 pinned to the end of the plunger 615 permits the operator to withdraw the plunger in effecting a relative offset between the bracket 609 and the rotary head 325. In performing each step of the conical machining operation, the operator need only to withdraw the plunger and move the bracket 609 to permit the plunger to lock the two elements together in the adjacent returning hole 614. Without resetting the cherrying drum 560, it is then possible to machine another portion of the conical configuration. Movement of the mounting bracket 609 on the V-slide 612 is accomplished by means of a small gear drive. This drive consists of a small gear and shaft member 617 rotatably mounted in the bracket 609 and having a knob 618 pinned to the lower end thereof. The gear 617 is designed to mesh with a gear rack 619 integrally formed in the V-slide cavity of the rotary head 325. By manually rotating the knob 618, it is possible to readily move the bracket 609 to any desired position.

When machining segments of a conical configuration, the cherrying drum 560 is set up as aforedescribed, and the machining operation is performed in the same manner. However, the movement of the rotary head 325 through an arc determined by the angular shape of the segment to be machined may be manually effected through the rotation of the hand wheel 401, or may be effected through the power rotation of the rotary head 325. In the latter case, it is necessary to position stop dogs 416 in the rotary head T-slot 417. The dogs will serve to engage the tripping element 418 and actuate the control mechanism within the head to disengage the power drive at a predetermined point of rotary head travel. The spacing of the trip dogs 416 will depend upon the segmental size of the conical configuration to be machined.

Another type of cherrying operation which may be performed with the cherrying means 422 on the aforedescribed machine includes elliptical cherrying in which the machine configuration has an elliptical shape. When this type of cherrying is to be performed, the cherrying drum 560 must be completely removed from the machine and an elliptical cherrying drum 623, shown in Figs. 13 and 14 used in its place. The principle of operation of the elliptical cherrying drum is basically the same as that previously described in connection with the drum 560, except that it provides for the predetermined adjustment of the drum in two planes. The drum may be adjusted to control the axial movement of the quill 283 along one radius and the movement of the cross slide along another radius, and thus provide two different components of movement.

Before the drum 623 is mounted in the transmission case 423 of the machine, the eccentric blocks therein must be precisely adjusted to provide the prescribed elliptical movement of the two aforementioned movable rotary head elements. In order to adjust the component of movement controlling the cross slide 326, the screw 624 rotatably mounted within the drum must be turned to move an eccentric block 625, having an extending stub shaft 626 integrally formed therewith, a predetermined distance on the ways 627 within the cherrying drum 623. As shown in Fig. 14, the eccentric block 625 is provided with a vernier scale 628 which may be read against a scale 629 on a front cover 630. Thus, the stub shaft 626 on the eccentric block 625 may be precisely positioned eccentrically relative to the center of the drum 623.

In a like manner, an adjustment of the elliptical cherrying drum can be effected to control the vertical component of elliptical movement. This is done by precisely positioning an eccentric block 631 threadedly retained on a screw 632 rotatably mounted within the drum 623, as shown in Fig. 13. The screw 632 is parallelly disposed relative to the screw 624 so that the movement of the eccentric blocks 625 and 631 is in the same plane.

The eccentric block 631 has a stub shaft 633 integrally formed therewith and extending therefrom. The screw 632 is precisely adjusted by inserting an Allen wrench into an hexagonal socket formed in the end thereof in a well known manner. A scale dial face 634 identical to that shown in Fig. 14, is provided on the back side of the elliptical cherrying drum 623. This face likewise permits for precise adjustment of the elliptical block 631 and stub shaft 633 relative to a center line 635 shown in Fig. 13 of the drum 623 and relative to the selected position of the stub shaft 626 previously mentioned for controlling the transverse movement of the cross slide.

After both of the eccentric blocks 625 and 631 have been precisely positioned, the screws 624 and 632 are locked in place to prevent any further movement of the two eccentric blocks. This is done by tightening a locking stud 636 centrally disposed between the two screws 624 and 632. When the stud 636 is tightened, it forces two contact shoes 637 and 638 outwardly into engagement with the wall of the eccentric blocks 625 and 631, respectively. Thereafter, the drum is operably positioned in the cross slide transmission 423. At this time, the stub shaft 633 on the eccentric block 631 will be journalled in the quill block 571 attached to the side of the quill 283 as aforedescribed. The setting of the eccentric block 631 and the stub shaft 633 thereon will determine the component of vertical movement of the quill 283. When the bracket 561 is moved into position, the stub shaft 626 on the forward eccentric block 625 will be journalled to fit into the bushing and guide block 573 operably mounted in the vertical slot 574 of the bracket 561, as aforedescribed. The setting of the eccentric block 625 and stub shaft 626 will determine the component of movement of the cross slide 326 in the rotary head 325. The combination of the two components will serve to generate an elliptical curve when the machine cutter is operating upon a workpiece.

For elliptical cherrying, the cherrying clutch 564 is positioned as shown in Fig. 21, to provide a drive from the shaft 514 to the gear 563. The gear 563, in turn, meshes with a gear 639 integrally formed on the periphery of the elliptical cherrying drum 623. As in the case of spherical and conical cherrying, the power drive to the quill 283 is disconnected and the cross feed screw 333 is disconnected from the cross slide 326. Thus, the quill 283 and the cross slide 326 are free to move according to the dictates of the elliptical cherrying drum 623. By merely power driving the drum 623, it is possible to move the cutter mounted in the spindle 34 along an elliptical path and thereby cut a slot in a workpiece having an elliptical contour. If the cherrying drum 623 is power driven simultaneously with the rotary head 325, the cutter will be made to follow a spiral path and effect an elliptical cherrying operation in machining a prescribed workpiece. If a partial or segmental elliptical cherry is to be machined, it is necessary to use stop dogs 416 in the T-slot 417 on the rotary head 325, as aforedescribed. These dogs will serve to stop rotary movement of the head at any circumferential position prescribing the limits of the desired segment. The operator would then have to start the cutter along the next path until the entire segmental elliptical cherrying operation had been completed. The rotary movement of the head 325 might also be effected through the manipulation of the hand wheel 401. This would serve to effect rotary movement of the cutter back and forth within the prescribed segment to machine the elliptical configuration.

When the machine is not being used for spherical, conical or elliptical cherrying, the cherrying drum must be removed from the machine in order to permit the quill 283 and the cross slide 326 to be reconnected for individual movement. When the cherrying drum has been removed, it is best to manipulate the selector handle 515 to the quill position whereat the power drive within the cross feed transmission 423 is connected to provide power movement of the quill. Likewise, the cross slide 326 is reconnected to the cross slide screw 333 within the rotary head by resetting the handle 334A. Thereafter, the cross slide may be selectively positioned in any transverse position on the rotary head 325 by turning the crank handle 332. A plate is used to cover the cavity in which the cherrying drum fits and serves to keep out dust and debris from the exposed gearing within the cross slide transmission 423.

The rotary head milling machine, as hereinbefore described, may also be utilized for milling threads upon a workpiece. Either internal or external threads of any diameter up to the maximum range of movement of the cross slide 326 may be machined in the following manner. Whenever threads are to be milled, the head drive is always utilized to effect correlated movement of the cross slide with the movement of the rotary head 325. Consequently, in setting up a thread milling operation, the control handle 466 must be positioned to shift the selector gear 464, as shown in Figs. 12 and 18, rightwardly to utilize the power from the aforedescribed rotary head transmission. The control handle 478 must be manipulated to the high speed range position when thread cutting is to be performed. The selection of gearing for the pick-off gear transmission 454 is dependent upon the number of threads per inch which are to be milled. Likewise, when setting up the machine for thread cutting, the speed of the rotary head must be determined from the setting of the spindle transmission 282. By varying the rate of rotation of the rotary head 325 in relation to the rate of advancement of the quill 283, it is possible to machine any size of thread. Since the rotary head and the quill are both driven from the same power source, the correlation between the rate of movement of each of these machine elements may be precisely set.

After the machine has been set up for a thread cutting operation and the workpiece has been mounted on the table, a cutter appropriately mounted in the spindle 34 is vertically positioned adjacent the cutting area by manually positioning the quill 283 or by positioning the rotary head assembly 30 on the column member 26. With the rotary head momentarily retained in a non-rotative position, the rotating cutter can then be fed to the required depth by manually adjusting the cross movement of the rotary head assembly 30 on the saddle 31, or by effecting movement of the table 27. Thereafter, the lever 411 on the side of the rotary head 30 must be manipulated to actuate the clutch 415 in the rotary head reverser mechanism, as shown in Fig. 4, and to start a power drive of the rotary head 325. The direction of rotation of the rotary head will determine whether a right hand or left hand thread is to be generated. Once the head 325 is power rotated, the cutter in the spindle 34 will be advanced or retracted through the power movement of the quill 283 a prescribed distance for each rotation of the rotary head. Thereafter, the rotary head mechanism will be power operated automatically to generate the thread.

If a second or finished cut of the thread is necessary, it is generally a problem to return the cutter into the thread and effect a uniform finish cut in the thread groove. This problem is completely eliminated in the aforedescribed machine because the cutter may be withdrawn from the cut and readily returned to the start of the thread and, thereafter, again engage the thread and perform a finishing cut. After the roughing thread cut is finished, the main drive motor 275 on the rotary head assembly 30 is deenergized to stop the movement of the rotary spindle head and the quill. The cutter is then withdrawn from the thread through the manual manipulation of the aforedescribed hand wheels to effect movement of the head or table as originally required in setting the tooth depth. By reversing the direction of rotation of the rotary head through the manipulation of the handle 411, the quill will be power driven in the opposite direction and can be returned to the starting point on the thread. When the cutter has been returned to this point, the rotary head reverse clutch 410 must again be actuated to effect a reversal of the drive to the rotary head 325. Thus, the rotary head will again be rotating as originally, and the cutter can be fed into the required finished depth. When the drive motor 275 is again energized, the same coordinated movement between the rotary head 325 and the quill 283 will occur to finish mill the thread. Since none of the feed settings were disturbed in returning the cutter to the starting position, the cutter will again match the rough thread and machine the same amount of stock from both sides of a thread groove. By changing the speed of the spindle, the degree of thread finish can be readily varied.

From the foregoing description of the procedure used in setting up the rotary head mechanism for thread cutting, it should be noted that any type or size of thread can be machined upon a workpiece providing such thread is of a type that the threaded area may be positioned in the same plane as the cutter spindle 34. Once the machine had been set up for a thread cutting operation, any number of workpieces could be threaded with the assurance that each thread would be identical in form and size. Numerous configurations and threads or segments thereof can be readily machined through the use of the machine as aforedescribed.

The foregoing description of preferred apparatus necessary in machining operations requiring the movement of a cutter in an angular or arcuate plane should make it apparent to those skilled in the art that an improved and highly efficient milling machine has been invented which is particularly adapted for machining spherical, conical and elliptical configurations having compound curvilinear shapes.

Although the rotary head machine tool shown in the drawings has been described with the thought of making a full disclosure of a practical apparatus embodying the invention, it is to be understood that the structure heretofore described is intended to be illustrative only and that the various novel features disclosed in this specification and constituting portions of the invention may be incorporated in other structural forms without departing from the spirit and scope of the invention as defined in the subjoined claims.

The principles of the invention having now been fully explained in the foregoing description of embodying apparatus, we hereby claim as our invention:

1. In a machine tool transmission and control mechanism for actuating a plurality of machine tool elements relative to a supporting base therefor, a power driven transmission, a drive means disposed to effect movement of each of said elements, a reverser mechanism for each of said elements operatively driven from said transmission and connected to operatively drive said drive means, a directional control mechanism operatively disposed to actuate said reverser mechanism and selectively provide a power drive for effecting movement in either direction for said elements, a manually operable drive means connected to provide manual movement of each of said elements, a plurality of hydraulic clamps disposed to retain said elements in any selected position, a hydraulic clamp control mechanism operatively connected to operate each of the clamping mechanisms on said element, and a hydraulic interconnecting means between said clamp control mechanism and said clamps, connected to render said power control means inoperative and thereby prevent the power operation of any of said elements when said clamping mechanism is actuated to retain said elements in a selected position.

2. A measuring device for a machine tool having a frame and a movable member slidably mounted on said frame and comprising a scale adjustably mounted on said frame, a scale pointer fixedly carried on said movable member and disposed to indicate movement of said member relative to said frame, a contact lug on said pointer, a slide bar operatively attached to said frame for lengthwise movement, a plurality of trip dogs adjustably mounted on said slide bar, a plurality of measuring rods carried on said slide bar adapted to enable precise positioning of said dogs on said bar, a plurality of control plungers disposed to engage said bar and connected to effectively control the power movement of said movable member, a movement indicating means mounted on said frame, an actuating mechanism engaging with said bar and connected to actuate said indicating mechanism upon lengthwise movement of said bar in either direction and resilient means to normally retain said actuating means in a balanced condition, whereby movement of said movable member will permit said contact lug to engage one of said dogs to disrupt the power movement of said movable member and actuate said slide bar to operate said indicating mechanism whereby the precise position of said movable member relative to said frame may be readily determined.

3. In a machine tool, a base, a movable element slidably mounted on said base, a motor driven transmission disposed in said base and connected to drive said movable element selectively in either direction at one of a plurality of feed rates, a scale pointer fixedly attached to said movable element, a contact lug extending from said pointer, a scale adjustably mounted on said base, a slide bar disposed for lengthwise movement on said base parallel to said scale, a plurality of trip dogs adjustably positionable on said slide bar, a measuring rod trough in said slide bar adapted to receive measuring rods in positioning said dogs, a contact block adjustably mounted on each of said dogs, and a control mechanism operative upon lengthwise movement of said slide bar to control the operation of said transmission and the power movement of said movable element whereby movement of said element serves to bring the contact lug on said scale pointer into engagement with a contact block on one of said dogs to precisely actuate said control mechanism and effect precise disengagement of said transmission to stop movement of said movable element at a predetermined point of travel.

4. A measuring device for a machine tool having a base and a power driven member slidably mounted on said base and comprising a scale pointer attached to said slidable member, a scale adjustably mounted on said base and disposed for selective adjustment relative to said pointer, a slide bar operatively mounted on said base, a plurality of dogs selectively mounted on said slidable member to adjustably retain said slide bar, a plurality of control plungers operatively disposed to be actuated through engagement with said slide bar, a measuring rod means carried on said bar to effect precise positioning of said dogs thereon, and an indicator means operatively actuated upon engagement with said slide bar, whereby said slidable element may be power driven into the range of a preselected position whereat said slide bar will actuate said control plungers to disengage said power drive and permit the machine operator to manually actuate said slidable member to a predetermined position as indicated by said indicator means.

5. In a machine tool, a frame, a spindle carrying head rotatably mounted in said frame, a cross slide mounted for radial movement in said head, a quill mounted for axial movement in said cross slide, a tool retaining spindle rotatably mounted in said quill, means operatively connected to drive said spindle regardless of the axial position of said quill, a pilot carrier assembly adapted to support said means and provide a power connection thereto regardless of the position of said rotary head, and a power driven transmission mounted in said frame and selectively manipulatable to provide a power drive to said pilot carrier assembly whereby said spindle may be power driven at any one of a plurality of speed rates.

6. In a machine tool, a rotary head case, a rotary head rotatably mounted in said case, a cross slide mounted for radial movement in said head, a quill slidably mounted for axial movement in said slide, a tool retaining spindle rotatably mounted in said quill, power driven means operatively connected to drive said tool spindle regardless of the position of said quill in said cross slide, range change gearing operably connected to said means, a drive mechanism operatively connected to drive said range change gearing, a gear shifter mechanism operatively disposed to effectively shift said gearing, and a control mechanism mounted in said rotary head case and connected to said shifter mechanism whereby said gears for driving said tool retaining spindle may be selectively shifted without regard to the position of the spindle as effected by the rotation of said rotary head.

7. In a machine tool, a rotary head frame, a spindle carrying head rotatably mounted in said frame, a cross slide mounted for radial movement in said head, a quill slidably mounted for axial movement in said cross slide, a tool retaining spindle rotatably journalled in said quill, a transmission case pivotally mounted on said head, range change gearing in said transmission operatively connected to drive said spindle and selectively adjustable to determine the range of operation of said spindle, a power connection drive means operably connected to drive said range change gears, a pilot carrier disposed in a plane parallel to the axis of rotation of said spindle, slide bars attached to said transmission case and slidably retained in said pilot carrier to support said case in any pivoted position depending upon the circular position of said spindle and spindle head, and a variable speed power driven transmission connected to said pilot carrier to provide a power drive to said spindle at one of a plurality of speed rates as selectively determined through the control of said variable speed transmission and said range change gearing.

8. In a machine tool, a rotary head frame, a rotary head mounted in said frame, a cross slide slidably mounted for selective radial positioning in said head, a quill slidably mounted for axial adjustment in said cross slide, a tool retaining spindle journalled for rotary operation in said quill, a drive mechanism operatively mounted in said frame and connectibly mounted on said rotary head to provide a power drive to said quill and spindle, a power driven spindle transmission contained in said frame and connected to actuate said drive mechanism, a control mechanism operative on said transmission to afford selective operation of said spindle and quill at predetermined speed rates, a feed transmission contained in said frame connectibly driven by said spindle transmission, a rotary head drive mechanism disposed in said frame to effect rotation of said rotary head and connectibly driven from said feed transmission, a control mechanism operatively disposed to provide selective control of the output rate of said feed transmission and control the rate of rotation of said rotary head whereby through the manipulation of said control mechanisms it is possible to precisely control the rate of operation between said spindle, said quill and said rotary head.

9. In a machine tool, a frame, a rotary head mounted in said frame, a cross slide mounted in said rotary head for selective positioning in a plane transverse of said rotatable head, a quill mounted in said cross slide, a tool retaining spindle rotatably mounted in said quill, a range change transmission pivotally mounted on said rotary head and connected to drive said spindle, a power driven transmission contained in said frame and operably connected to said range change transmission, a second transmission contained in said frame and operably connected to drive said rotary head, a power take-off from said spindle, a fixed step transmission connected to said take-off, a second power take-off operably connected to said rotary head, a second transmission contained in said cross slide and connected to be driven from said second take-off, a reverser mechanism operably connected to drive said quill, a selector gear operably connected to said reverser mechanism and disposed to selectively transmit the power from said spindle transmission or said rotary transmission to said reverser mechanism and control mechanism disposed to selectively position said selector gear and operate said reverser mechanism whereby said quill may be power driven from either of said power take-offs at any one of a plurality of feed rates.

10. In a machine tool, a frame, a rotatable spindle head operably mounted in said frame, a cross slide operably mounted in said rotatable head for selective transverse positioning therein, a quill operably mounted in said cross slide and disposed for selective axial positioning therein, a tool retaining spindle rotatably journalled in said quill, a spindle drive mechanism contained in said frame and connected to drive said spindle, a rotary head drive mechanism operably connected to effect rotation of said head, a single power source connected to drive each of said drive mechanisms, a fixed step transmission operably mounted in said cross slide and driven from said spindle, a second fixed step transmission driven from said rotary head, a selector gear adapted for selective positioning to transmit power from either of said transmissions, a reverser mechanism operably connected to and driven from said selector gear, a quill drive means connected to said quill, and control means to render said reverser mechanism manually or automatically operative whereby it is possible to effect power movement of said quill from either said spindle drive mechanism or said rotary head drive mechanism and provide for the manual control of said quill drive or to provide an automatic and continuously operating drive for said quill.

11. In a rotary head machine tool, a frame, a rotatable tool spindle mounted for universal transverse bodily movement in said frame, a spindle drive mechanism contained in said frame and connected to drive said rotatable tool spindle, a plurality of power take-offs from said drive mechanism, a plurality of transmissions individually driven from one of said take-offs, a selector gear operative to complete a power drive from either of said transmissions, a reverser mechanism operably connected to said selector gear to be driven by either of said transmissions, a spindle retaining quill disposed to be operatively driven from said reverser mechanism and a control means adapted to provide for automatic or manual operation of said control means whereby said movement of said quill can be manually or automatically controlled on said machine.

12. A rotary head machine tool having a power driven tool spindle mounted for universal transverse movement, a quill mounted for slidable movement and disposed to rotatably support said spindle, a power drive, a reverser mechanism connectably driven from said power drive and disposed to selectively drive said quill, a control mechanism disposed to effect control of said reverser mechanism, a single control lever operatively disposed to provide selective operation of said control mechanism and control said reverser mechanism to provide a power drive to drive said quill in either direction, a linkage mechanism operatively connected to said control mechanism, trip dogs operatively connected to said quill and selectively positionable to determine the limits of travel of said quill upon engagement with said linkage mechanism, and automatic means connected to said control mechanism and operative from said control lever whereby said quill may be power driven within predetermined limits of travel with automatic reversal occurring each time said trip dogs engage said linkage mechanism and actuate said control mechanism.

13. In a rotary head machine tool, a frame, a rotary head mounted in said frame, a cross slide mounted for selective transverse positioning in said rotary head, a quill disposed for axial movement in said cross slide, a tool retaining spindle rotatably mounted in said quill, a variable speed power spindle, a second variable speed power drive connected to drive said rotary head, a transmission driven from said spindle, a second transmission driven from said rotary head, a range change gear selector means selectively operable to connect said gearing to either of said transmissions, a reverser mechanism driven from said gearing, a quill drive mechanism operably connected to effect axial movement of said quill and driven from said reverser mechanism, and control means connected to provide selective operation of said reverser mechanism whereby said quill may be operably driven in either direction at a predetermined rate relative to the rate of rotation of said spindle or of said rotary head.

14. In a rotary head machine tool, a frame, a rotary head operably mounted in said frame, a cross slide mounted for selective transverse positioning in said rotary head, a quill mounted for selective axial movement in said cross slide, a tool retaining spindle rotatably journalled in said quill, a power driven transmission disposed in said frame and connected to drive said spindle and said rotary head in a predetermined relationship, a transmission contained in said cross slide and operably driven from said spindle, a second transmission operably contained in said cross slide and driven from said rotary head, a range change mechanism, a selector means operative to connect either of said transmissions to said range change mechanism, a reverser mechanism operatively connected to said range change mechanism, a second selector means driven from said reverser mechanism, a feed drive operatively connected to provide a power drive for said quill, a cherrying attachment operatively disposed on said cross slide and operatively disposed to be driven from said second selector means, and control means disposed to selectively operate said second selector means whereby a power drive may be provided from either said spindle or said rotary head to selectively drive either said quill or said cherrying attachment and effect controlled movement of said quill and said tool retaining spindle.

15. In a rotary head milling machine having a slidably movable work retaining table and a tool retaining spindle including a plurality of movable elements rotatably mounted to effect movement in a plurality of transverse planes, a cherrying device operatively mounted on said machine, an eccentric block slidably mounted in said device, a screw shaft rotatably mounted in said device and connectibly disposed to drive said eccentric block, a power connection from said milling machine to said cherrying device to effect selective rotation thereof, and means connecting said cherrying device with two movable elements of the rotary head spindle whereby said cherrying device serves to coordinate the movement of the two movable elements simultaneously and effect a corresponding movement of the tool retaining spindle to perform an intricate cherrying operation.

16. An elliptical cherrying mechanism for coordinating movements of a plurality of elements supporting a tool retaining spindle in a rotary head milling machine and comprising, a cherrying drum rotatably mounted in one of said elements, a power source from the milling machine disposed to selectively drive said drum, a screw shaft rotatably journalled within said drum, an eccentric block threadably retained on said screw shaft and operatively connected to one of said movable machine elements, a second screw shaft rotatably mounted in said drum, a second eccentric block threadably retained on said second shaft, a support bracket fixedly mounted on said machine and disposed to be operably connected with said second eccentric block, and locking means selectively operable to lock each of said screw shafts in any adjusted position whereby the rotation of said drum serves to coordinate the movement of two machine tool elements in effecting an elliptical cherrying machining operation.

17. A machine tool comprising a bed, a work retaining table slidably mounted on said bed, a power drive means selectively operable to drive said table, an upright attached to said bed, a saddle slidably disposed for vertical movement on said upright, a rotary head assembly slidably disposed for horizontal movement on said saddle, a power drive means selectively operable to effect power movement of said saddle and said rotary head assembly, a rotary head journalled in said assembly, a cross slide mounted for selective radial positioning in said rotary head, a quill mounted for selective axial vertical movement in said cross slide, a tool retaining spindle rotatably journalled in said quill, a cherrying device operatively mounted in said cross slide and connected to said rotary head and said quill, and a power drive selectively operable to effect rotation of said spindle and of said rotary head and to provide a power drive to said quill and to said cherrying device selectively whereby movement of said tool retaining spindle in any one of a plurality of transverse planes may be coordinated and effectively controlled.

18. In a machine tool having a manual and power drive for effecting selective movement of a machine element, a power source, a transmission operatively connected to said power source to drive the machine element, a pivotally mounted control handle connected to selectively control the power operation of said transmission, a shaft disposed to operatively intersect the range of control handle movement, a hand wheel rotatably mounted on said shaft, a clutch operative upon axial positioning of said handwheel to selectively effect manual operation of said transmission and movement of the machine element when said control handle is in a neutral position, a hydraulic clamping mechanism disposed to effect selective clamping of the machine element in any desired position, a hydraulic control mechanism connected to said clamping mechanism, an actuator hydraulically connected with said control mechanism and operative to axially shift said shaft and said handwheel to one of two positions, namely, one whereat said shaft is axially retracted to prevent operation of said control mechanism whenever said clamping mechanism is rendered hydraulically operative, or secondly whereat said shaft is shifted outwardly to permit selective manipulation of said control handle in effecting power movement of the machine element and prevent the operation of the clamping mechanism when the machine element is power driven.

19. A machine tool having a work support and a rotary tool carrying spindle mounted for bodily movement in two angularly disposed planes, and comprising cherrying means operative to move said spindle in a circular path in each of said planes, a power source, a transmission driven from said power source and connected to rotatably drive said spindle and effect gyratory movement thereof, a second transmission driven from said spindle and selectively variable to provide a power drive to said cherrying means in effecting movement of said spindle in a circular path in each of said planes, and a control means selectively operable to vary said second transmission whereby the rate of power rotation of said spindle relative to the power output to said cherrying means may be selectively varied in effecting a predetermined cutting operation upon a workpiece fixedly mounted on said work support.

20. In a machine tool including a base, a movable member mounted for movement relative to said base, a motor driven transmission connected to selectively effect directionally controlled and rate controlled movement of said member, a control element selectively operable to regulate said transmission for controlling the power operation of said movable member, said control element having a neutral position in which the power train to said movable member is interrupted, a handwheel selectively engageable to effect manual operation of said movable element, locking means connected for operation with said handwheel to prevent movement of said control element from its neutral position when the handwheel is engaged for manual operation, and to release said control element when the handwheel is disengaged, a hydraulic clamping mechanism connected to selectively clamp said movable member in a desired position, and a hydraulic actuating means operable with said clamping mechanism to actuate said locking means and thereby prevent movement of said control element from its neutral position at the same time that said clamping mechanism is actuated for clamping said movable member in position, whereby the power train to said movable member cannot be completed while said clamping mechanism is actuated for clamping the movable member in position.

21. In a machine tool transmission and control mechanism operatively disposed to effect movement of a movable element on the base of a machine tool, a motor driven transmission, a reverser mechanism operatively driven from said transmission and including a control lever, a drive means connected to effect movement of said movable element and driven from said reverser mechanism, a source of hydraulic pressure, a plurality of hydraulic clamping mechanisms connected to be actuated by hydraulic pressure from said source to clamp said movable element in any desired position, a hydraulic motor connected to be actuated by hydraulic pressure from said source to lock said control lever in a neutral position to prevent the transmission of power through said reverser mechanism and thereby prevent power operation of said movable element, and a control valve connected to control the flow of hydraulic pressure from said source to said clamping mechanisms and said hydraulic motor simultaneously so that when it is actuated it directs fluid pressure to said clamping mechanisms and said hydraulic motor, whereby when said clamping mechanisms are actuated to clamp the movable element in position the hydraulic motor is also actuated to prevent the transmission of power for power operation of said movable element.

22. A control mechanism for a machine tool having a movable element arranged for selective movement in either direction, a power driven transmission connected to drive said movable element in its path of movement, a shaft, a hydraulic actuator connected to axially actuate said shaft, a handwheel rotatably mounted on said shaft to move with it axially, a clutch mechanism operable upon the axial movement of said handwheel to connect the handwheel for effecting manual movement of the movable element, a control handle mounted for pivotal movement and connected to control said power driven transmission by its pivotal movement to regulate the direction of power movement of said movable element, said control handle having a neutral position in which the power driven transmission is disconnected from said movable element to preclude its power movement, a locking mechanism rendered operable by the axial movement of said handwheel to lock said control handle in its neutral position and thereby prevent power movement of said movable element, a hydraulic clamping mechanism connected to clamp the movable element in any desired position when actuated, and control means connected to control the flow of hydraulic pressure to said hydraulic actuator and said hydraulic clamping mechanism to actuate them both at the same time, whereby said hydraulic actuator will move said handwheel axially to operate said locking mechanism and thereby prevent the transmission of power to said movable element while said clamping mechanism is actuated to clamp the movable element in position.

23. A control mechanism for a machine tool having a movable element arranged for selective movement in either direction, a power driven transmission connected to drive said movable element in its path of movement, a control handle mounted for pivotal movement and connected to control said power driven transmission by its pivotal movement to regulate the direction of power movement of said movable element, said control handle having a neutral position in which the power driven transmission is disconnected from said movable element to preclude its power movement, a locking mechanism connected to be actuated hydraulically to lock said control handle in its neutral position and thereby prevent power movement of said movable element, a hydraulic clamping mechanism connected to clamp the movable element in any desired position when actuated, and control means connected to control the flow of hydraulic pressure to said locking mechanism and said hydraulic clamping mechanism to actuate them both at the same time, whereby said locking mechanism will be actuated to prevent the transmission of power to said movable element while said clamping mechanism is actuated to clamp the movable element in position.

References Cited in the file of this patent

UNITED STATES PATENTS

| Number | Name | Date |
|---|---|---|
| 565,642 | Sweet | Aug. 11, 1896 |
| 1,076,242 | Sears | Oct. 21, 1913 |
| 1,785,395 | Shaw et al. | Dec. 16, 1930 |
| 1,942,209 | Graves et al. | Jan. 2, 1934 |
| 1,958,507 | Archea | May 15, 1934 |
| 1,978,374 | Romaine et al. | Oct. 23, 1934 |
| 1,999,225 | Williamson | Apr. 30, 1935 |
| 2,123,825 | De Vlieg | July 12, 1938 |
| 2,224,108 | Ridgway | Dec. 3, 1940 |
| 2,244,413 | Armitage | June 3, 1941 |
| 2,340,210 | Armitage et al. | Jan. 25, 1944 |
| 2,379,405 | Armitage | July 3, 1945 |
| 2,379,870 | Barker | July 10, 1945 |
| 2,391,398 | De Vlieg | Dec. 25, 1945 |
| 2,402,179 | Nord | June 18, 1946 |
| 2,464,415 | Philippe | Mar. 15, 1949 |
| 2,472,151 | Ewaldson | June 7, 1949 |